US008463099B2

(12) United States Patent
Makino et al.

(10) Patent No.: US 8,463,099 B2
(45) Date of Patent: Jun. 11, 2013

(54) RESIN COMPOSITION FOR OPTICAL MATERIAL, RESIN FILM FOR OPTICAL MATERIAL, AND OPTICAL WAVEGUIDE USING THEM

(75) Inventors: Tatsuya Makino, Ibaraki (JP); Atsushi Takahashi, Ibaraki (JP); Masatoshi Yamaguchi, Ibaraki (JP); Toshihiko Takasaki, Ibaraki (JP); Tomoaki Shibata, Ibaraki (JP); Masami Ochiai, Ibaraki (JP)

(73) Assignee: Hitachi Chemical Company, Tokyo (JP)

( * ) Notice: Subject to any disclaimer, the term of this patent is extended or adjusted under 35 U.S.C. 154(b) by 580 days.

(21) Appl. No.: 12/526,812

(22) PCT Filed: Feb. 8, 2008

(86) PCT No.: PCT/JP2008/052175
§ 371 (c)(1),
(2), (4) Date: Aug. 12, 2009

(87) PCT Pub. No.: WO2008/099787
PCT Pub. Date: Aug. 21, 2008

(65) Prior Publication Data
US 2010/0040339 A1 Feb. 18, 2010

(30) Foreign Application Priority Data

Feb. 14, 2007 (JP) .................................. 2007-033357
May 10, 2007 (JP) .................................. 2007-125854

(51) Int. Cl.
G02B 6/00 (2006.01)
C08L 67/00 (2006.01)
C08L 71/12 (2006.01)
C08F 2/46 (2006.01)

(52) U.S. Cl.
USPC ........... 385/141; 385/143; 385/145; 522/135; 522/142; 522/143; 522/144; 430/280.1

(58) Field of Classification Search
USPC ................ 522/135, 142, 143, 144; 385/141, 385/143, 145; 525/132; 430/280.1, 270.1
See application file for complete search history.

(56) References Cited

U.S. PATENT DOCUMENTS 4,608,400 A * 8/1986 Yokoshima et al. ............ 522/96
4,638,038 A * 1/1987 Salensky ....................... 525/533
(Continued)

FOREIGN PATENT DOCUMENTS
JP 3-119025 5/1991
JP 03-119027 5/1991
(Continued)

OTHER PUBLICATIONS

Extended European Search Report, including Supplementary European Search Report and Search Opinion, dated May 4, 2010, for Application No. EP 08 71 1054.

Primary Examiner — Susan W Berman
(74) Attorney, Agent, or Firm — Antonelli, Terry, Stout & Kraus, LLP.

(57) ABSTRACT

The present invention relates to a resin composition for an optical material comprising (A) a carboxylic acid-modified phenoxy resin, (B) a polymerizable compound and (C) a polymerization initiator, a resin film for an optical material comprising the above resin composition and an optical waveguide having a core part and/or a cladding layer formed by using the same. Provided are a resin composition for an optical material which is excellent in a heat resistance and a transparency and which is soluble in an alkaline aqueous solution, a resin film for an optical material comprising the above resin composition and an optical waveguide produced by using the same.

20 Claims, 1 Drawing Sheet

U.S. PATENT DOCUMENTS

| | | |
|---|---|---|
| 5,162,440 A | 11/1992 | Akkapeddi et al. |
| 5,677,398 A * | 10/1997 | Motoshima et al. .......... 525/531 |
| 5,968,867 A * | 10/1999 | Song et al. .................... 502/168 |
| 7,747,129 B2 * | 6/2010 | Makino et al. ................ 385/141 |
| 7,853,113 B2 * | 12/2010 | Makino et al. ................ 385/141 |
| 8,036,511 B2 * | 10/2011 | Makino et al. ................ 385/141 |
| 2005/0148676 A1 | 7/2005 | Doi et al. |
| 2009/0062421 A1 * | 3/2009 | Makino et al. ................ 522/134 |
| 2010/0040339 A1 * | 2/2010 | Makino et al. ................ 385/141 |

FOREIGN PATENT DOCUMENTS

| | | |
|---|---|---|
| JP | 06-258537 | 9/1994 |
| JP | 06-324489 | 11/1994 |
| JP | 07-261388 | 10/1995 |
| JP | 2000-047383 | 2/2000 |
| JP | 2000-147765 | 5/2000 |
| JP | 2003-195079 | 7/2003 |
| JP | 2006-028419 | 2/2006 |
| WO | WO 2006/038691 A1 | 4/2006 |

* cited by examiner

RESIN COMPOSITION FOR OPTICAL MATERIAL, RESIN FILM FOR OPTICAL MATERIAL, AND OPTICAL WAVEGUIDE USING THEM

TECHNICAL FIELD

The present invention relates to a resin composition for an optical material, a resin film for an optical material and an optical waveguide prepared by using the same. Specifically, it relates to a resin composition for an optical material which is excellent in a heat resistance and a transparency and which is soluble in an alkaline aqueous solution, a resin film for an optical material comprising the above resin composition and an optical waveguide prepared by using the same.

BACKGROUND ART

In recent years, in high speed & high density signal transmission between electronic devices and between wiring boards, transmission through conventional electric wirings is restricted in a rise in a speed and a density due to barriers brought about by mutual interference and attenuation of signals. In order to break through the above barriers, a technique for connecting electronic devices and printed wiring boards with each other by means of light, so-called optical interconnection is investigated. A polymer optical waveguide attracts attentions as an optical transmission line in terms of easier processing, a lower cost, a higher freedom of wirings and a possible rise in a density. A type in which a polymer optical waveguide is prepared on a glass epoxy resin substrate assuming that it is applied to a photoelectric composite board and a flexible type having no rigid support base assuming that boards are connected with each other are worked out as the form of the polymer optical waveguide.

A high heat resistance in addition to a high transparency (low optical transmission loss) is required to a polymer optical waveguide from the viewpoints of use environment of appliances to which it is applied and mounting of parts, and (meth)acrylic polymers are known as a material for the above optical waveguide (refer to, for example, patent documents 1 and 2). The (meth) acrylic polymers have a high transparency of 0.3 dB/cm in a wavelength of 850 nm, but the evaluations of the heat resistance, for example, the specific test results of an optical transmission loss after a solder reflow test and the like are not specifically described therein and are not clear.

Resin compositions containing a carboxylic acid-modified phenoxy resin are known as a light-sensitive resin composition which is excellent in a heat resistance and which can be developed by an alkaline aqueous solution (refer to, for example, patent documents 3 and 4). However, the above resin compositions have been invented for plating resists in a production process for printed wiring boards, and they are excellent in a heat resistance but low in a transparency and are not suitable as a resin composition for an optical material.

Patent document 1: Japanese Patent Application Laid-Open No. 258537/1994
Patent document 2: Japanese Patent Application Laid-Open No. 195079/2003
Patent document 3: Japanese Patent Application Laid-Open No. 47383/2000
Patent document 4: Japanese Patent Application Laid-Open No. 147765/2000

DISCLOSURE OF THE INVENTION

The present invention has been made in order to solve the problems described above, and an object of the present invention is to provide a resin composition for an optical material which is excellent in a heat resistance and a transparency and which is soluble in an alkaline aqueous solution, a resin film for an optical material comprising the above resin composition and an optical waveguide prepared by using the same.

Intensive investigations repeated by the present inventors have resulted in finding that the problems described above can be solved by using a resin composition for an optical material which comprises (A) a carboxylic acid-modified phenoxy resin and contains (B) a polymerizable compound and (C) a polymerization initiator in combination and which is soluble in an alkaline aqueous solution and a resin film for an optical material comprising the above resin composition to produce an optical waveguide.

That is, the present invention provides a resin composition for an optical material comprising (A) a carboxylic acid-modified phenoxy resin containing a repetitive unit (A-1) represented by the following Formula (1) and a repetitive unit (A-2) represented by the following Formula (2), (B) a polymerizable compound and (C) a polymerization initiator, a resin film for an optical material comprising the above resin composition and an optical waveguide having a core part and/or a cladding layer which is formed by using the resin composition for an optical material or the resin film for an optical material described above:

[Formula 1]

$$-(X^1-CH_2CHCH_2)- \quad (1)$$
$$\underset{|}{O}$$
$$X^2-CO_2H$$

A-1

(wherein $X^1$ represents any divalent group of:

[Formula 2]

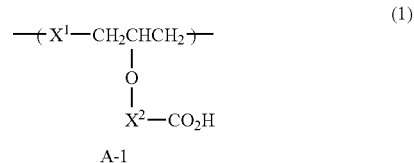

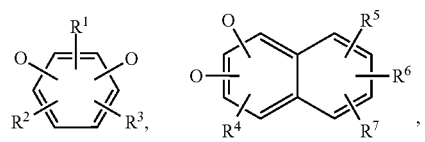

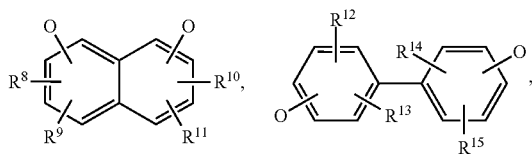

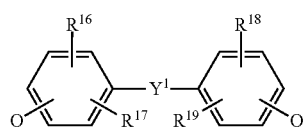

$X^2$ represents a divalent organic group having 1 to 20 carbon atoms; $Y^1$ represents any divalent group of:

[Formula 3]

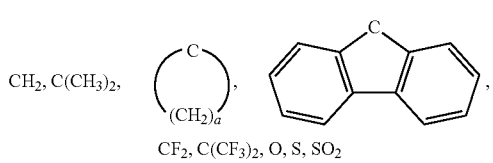

$CF_2, C(CF_3)_2, O, S, SO_2$ $R^1$ to $R^{19}$ each represent independently any of a hydrogen atom, a fluorine atom, an organic group having 1 to 20 carbon atoms and a fluorine-containing organic group having 1 to 20 carbon atoms; and a represents an integer of 2 to 10); and

[Formula 4]

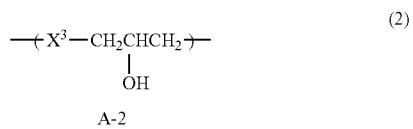

(wherein $X^3$ represents any divalent group of:

[Formula 5]

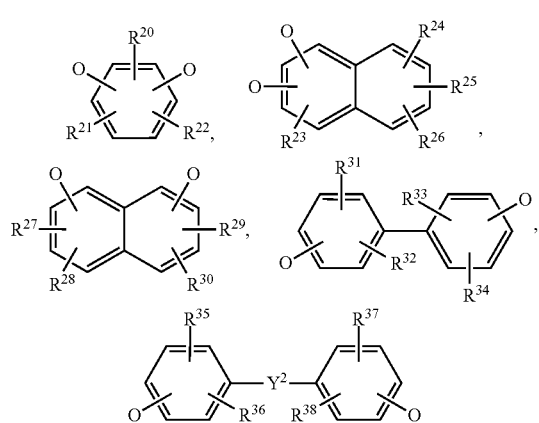

$Y^2$ represents any divalent group of:

[Formula 6]

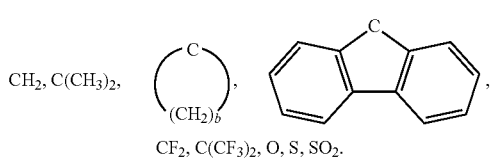

$CF_2, C(CF_3)_2, O, S, SO_2$.

$R^{20}$ to $R^{38}$ each represent independently any of a hydrogen atom, a fluorine atom, an organic group having 1 to 20 carbon atoms and a fluorine-containing organic group having 1 to 20 carbon atoms; and b represents an integer of 2 to 10).

The resin composition of the present invention for an optical material and the resin film for an optical material comprising the above resin composition are soluble in an alkaline aqueous solution, and an optical waveguide prepared by using them is excellent in a heat resistance and a transparency.

EXPLANATION OF CODES

Figure 1:
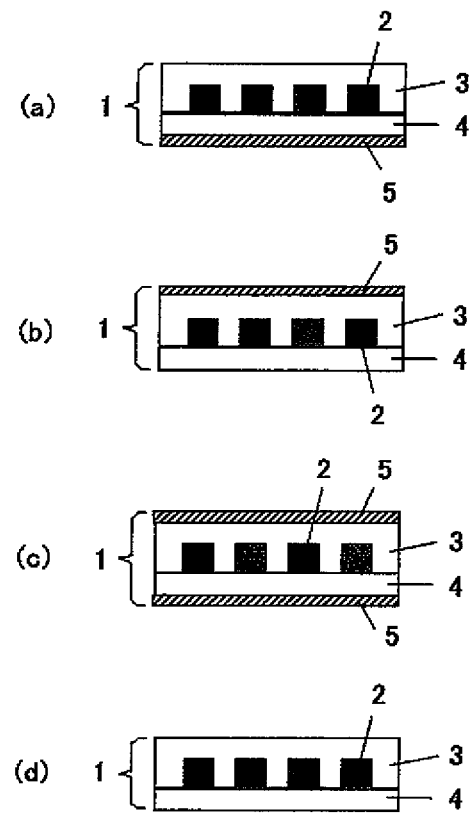
FIG. 1 is a cross-sectional drawing for explaining the form of the optical waveguide of the present invention.

| | |
|---|---|
| 1 | Optical waveguide |
| 2 | Core part |
| 3 | Upper cladding layer |
| 4 | Lower cladding layer |
| 5 | Substrate or cover film |

BEST MODE FOR CARRYING OUT THE INVENTION

The resin composition of the present invention for an optical material comprises the carboxylic acid-modified phenoxy resin (A), the polymerizable compound (B) and the polymerization initiator (C). Further, it is preferably a resin composition which is cured by heating or irradiating with an actinic ray.

The component (A) used in the present invention shall be explained below.

The carboxylic acid-modified phenoxy resin of the component (A) used in the present invention is preferably a phenoxy resin which is dissolved in a developer comprising an alkaline aqueous solution and which has a solubility to such an extent that targeted developing treatment is carried out. The carboxylic acid-modified phenoxy resin containing the repetitive unit (A-1) represented by the following Formula (1) and the repetitive unit (A-2) represented by the following Formula (2) in a main chain is used from the viewpoints of a transparency, a heat resistance and a solubility in an alkaline aqueous solution:

[Formula 7]

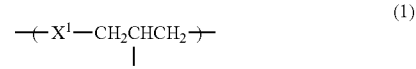

(wherein $X^1$ represents any divalent group of:

[Formula 8]

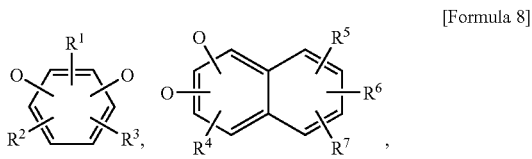

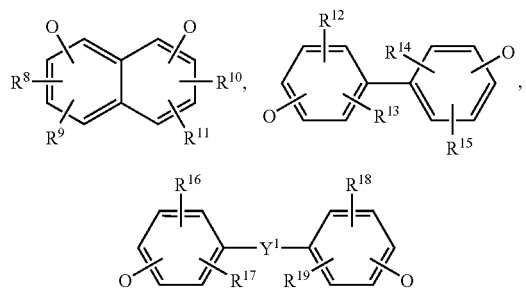

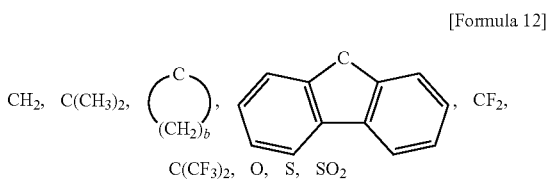

$X^2$ represents a divalent organic group having 1 to 20 carbon atoms; $Y^1$ represents any divalent group of:

[Formula 9]

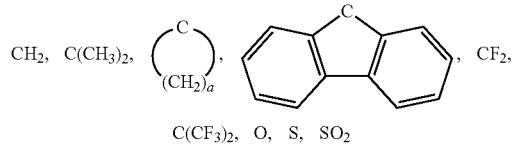

$R^1$ to $R^{19}$ each represent independently any of a hydrogen atom, a fluorine atom, an organic group having 1 to 20 carbon atoms and a fluorine-containing organic group having 1 to 20 carbon atoms; and a represents an integer of 2 to 10); and

[Formula 10]

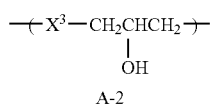

(wherein $X^3$ represents any divalent group of:

[Formula 11]

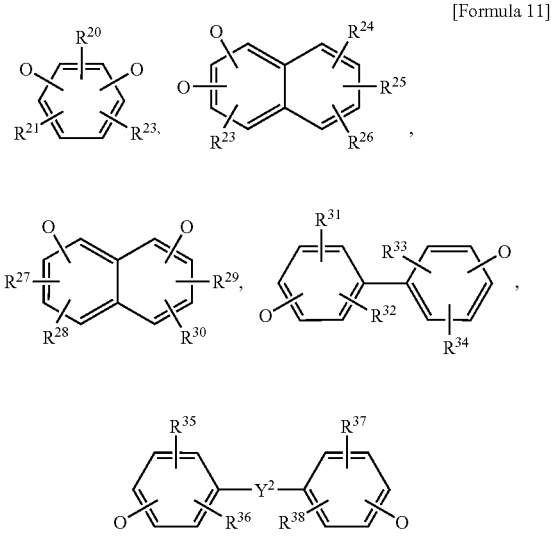

$Y^2$ represents any divalent group of:

[Formula 12]

$CH_2$, $C(CH_3)_2$, $\begin{pmatrix} C \\ (CH_2)_b \end{pmatrix}$, fluorene, $CF_2$, $C(CF_3)_2$, O, S, $SO_2$ $R^{20}$ to $R^{38}$ each represent independently any of a hydrogen atom, a fluorine atom, an organic group having 1 to 20 carbon atoms and a fluorine-containing organic group having 1 to 20 carbon atoms; and b represents an integer of 2 to 10).

The organic groups in Formula (1) and Formula (2) include, for example, monovalent or divalent groups such as an alkyl group, a cycloalkyl group, an aryl group, an aralkyl group, a carbonyl group, a carboxy group, an ester group, an amide group, a carbonate group, a urethane group, an alkoxy group, an aryloxy group, an alkylthio group, an arylthio group, an amino group, a silyl group, a vinyl group, an allyl group, a (meth)acryloyl group and the like, and they may be substituted with a hydroxyl group, a halogen atom, an alkyl group, a cycloalkyl group, an aryl group, an aralkyl group, a carbonyl group, a carboxy group, an ester group, an amide group, a carbonate group, a urethane group, an alkoxy group, an aryloxy group, an alkylthio group, an arylthio group, an amino group, a silyl group, a vinyl group, an allyl group, a (meth)acryloyl group and the like. A (meth)acryloyl group means an acryloyl group and/or a methacryloyl group.

In the carboxylic acid-modified phenoxy resin of the component (A), a content of the repetitive unit (A-1) having a difunctional phenol skeleton and a carboxy group is preferably 10 to 99% by mass. If it is 10% by mass or more, the carboxylic acid-modified phenoxy resin is liable to be dissolved in a developer comprising an alkaline aqueous solution and the like, and if it is 99% by mass or less, the developer resistance (property that a part which is a pattern without being removed by development is not affected by a developer) is good in a developing step in which a layer of a light-sensitive resin composition is selectively removed by development described later to form a pattern. From the viewpoints described above, the content is more preferably 20 to 95% by mass, particularly preferably 30 to 90% by mass.

The structure of the repetitive unit (A-1) having a difunctional phenol skeleton and a carboxy group shall not specifically be restricted as long as it is represented by Formula (1). The difunctional phenol skeleton $X^1$ used for the repetitive unit (A-1) includes, for example, skeletons originating in mononuclear difunctional phenols such as hydroquinone, resorcinol, catechol, 1,4-naphthalenediol, 1,5-naphthalenediol, 1,6-naphthalenediol, 1,7-naphthalenediol and the like, organic group-substituted groups thereof and fluorine-containing organic group-substituted groups thereof; skeletons originating in multinuclear difunctional phenols such as 2,2'-biphenol, 4,4'-biphenol, bisphenol A, tetrabromobisphenol A, bisphenol F, bisphenol AD, bisphenol S, fluorene type bisphenol and the like, organic group-substituted groups thereof and fluorine-containing organic group-substituted groups thereof such as bisphenol AF and the like. Among them, skeletons originating in the multinuclear difunctional phenols, the organic group-substituted groups thereof and the fluorine-containing organic group-substituted groups thereof such as bisphenol AF and the like each described above are preferred from the viewpoints of the transparency and the heat resistance. The above skeletons can be used alone or in combination of two or more kinds thereof.

The organic group $X^2$ used for the repetitive unit (A-1) shall not specifically be restricted as long as it is a divalent organic group having 1 to 20 carbon atoms, and it includes, for example,

[Formula 13]

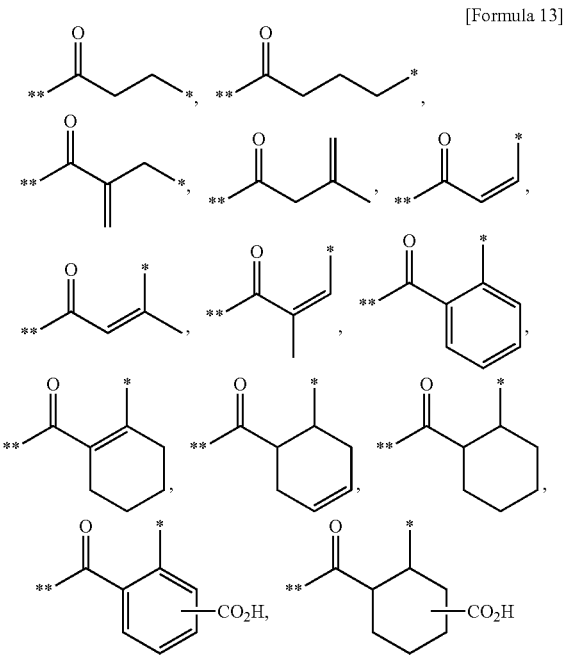

Among them,

[Formula 14]

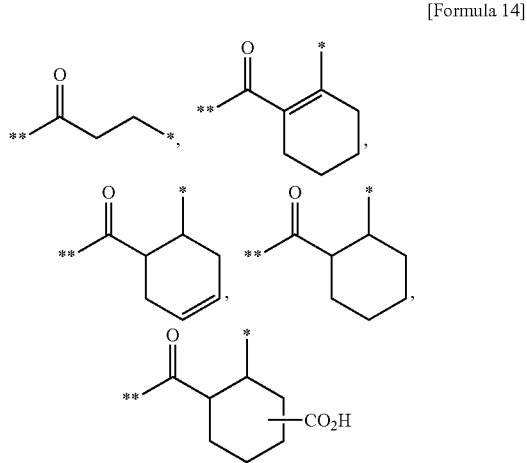

are preferred from the viewpoints of the transparency, the heat resistance and the solubility. In this respect, a carbon atom marked with "*" which is contained in the organic group $X^2$ shown above as the examples is bonded with a carbon atom of a carboxy group adjacent to $X^2$ in Formula (1), and a carbon atom marked with "**" adjacent to a carbonyl group which is contained in the organic group $X^2$ is bonded with an oxygen atom adjacent to $X^2$ in Formula (1). The above organic groups can be used alone or in combination of two or more kinds thereof.

In the carboxylic acid-modified phenoxy resin of the component (A), a content of the repetitive unit (A-2) having a difunctional phenol skeleton and a hydroxy group is preferably 1 to 90% by mass. If it is 1% by mass or more, the developer resistance is good in the developing step in which a layer of a light-sensitive resin composition is selectively removed by development described later to form a pattern, and if it is 90% by mass or less, the carboxylic acid-modified phenoxy resin is liable to be dissolved in a developer comprising an alkaline aqueous solution and the like. From the viewpoints described above, the content is more preferably 5 to 80% by mass, particularly preferably 10 to 70% by mass.

The structure of the repetitive unit (A-2) having a difunctional phenol skeleton and a hydroxy group shall not specifically be restricted as long as it is represented by Formula (2). The difunctional phenol skeleton $X^3$ used for the repetitive unit (A-2) includes, for example, skeletons originating in mononuclear difunctional phenols such as hydroquinone, resorcinol, catechol, 1,4-naphthalenediol, 1,5-naphthalenediol, 1,6-naphthalenediol, 1,7-naphthalenediol and the like, organic group-substituted groups thereof and fluorine-containing organic group-substituted groups thereof; skeletons originating in multinuclear difunctional phenols such as 2,2'-biphenol, 4,4'-biphenol, bisphenol A, tetrabromobisphenol A, bisphenol F, bisphenol AD, bisphenol S, fluorene type bisphenol and the like, organic group-substituted groups thereof and fluorine-containing organic group-substituted groups thereof such as bisphenol AF and the like. Among them, skeletons originating in the multinuclear difunctional phenols, the organic group-substituted groups thereof and fluorine-containing organic group-substituted groups thereof such as bisphenol AF and the like each described above are preferred from the viewpoints of the transparency and the heat resistance. The above skeletons can be used alone or in combination of two or more kinds thereof.

The carboxylic acid-modified phenoxy resin of the component (A) shall not specifically be restricted in a synthetic process thereof and can be obtained by, for example, dissolving a phenoxy resin in a solvent and subjecting it to addition reaction with polybasic acid anhydride at a temperature of 60 to 115° C. using, if necessary, a suitable catalyst to prepare a phenoxy resin containing a carboxyl group in a molecule thereof. A use amount of the polybasic acid anhydride is controlled so that the contents of the repetitive unit (A-1) and the repetitive unit (A-2) fall in the ranges described above.

The polybasic acid anhydride includes succinic anhydride, glutaric anhydride, itaconic anhydride, maleic anhydride, citraconic anhydride, phthalic anhydride, tetrahydrophthalic anhydride, hexahydrophthalic anhydride, trimellitic anhydride, hexahydrotrimellitic anhydride and the like.

The soluble solvent includes amide base solvents such as formamide, N-methylformamide, N,N-dimethylformamide, acetamide, N-methylacetamide, N,N-dimethylacetamide, 2-pyrrolidone, N-methylpyrrolidone and the like; ketone base solvents such as methyl ethyl ketone, methyl isobutyl ketone, 3-pentanone, diisobutyl ketone, cyclopentanone, cyclohexanone, methylcyclohexanone, acetophenone, acetyl acetone and the like; ether base solvents such as ethylene glycol dimethyl ether, ethylene glycol monoethyl ether, ethylene glycol monobutyl ether, propylene glycol monomethyl ether, propylene glycol monomethyl ether acetate, diethylene glycol monomethyl ether, diethylene glycol dimethyl ether and the like.

The catalyst includes organic phosphorus compounds such as triamide hexamethylphosphate, tri(dichloropropyl) phosphate, tri(chloropropyl) phosphate, trimethyl phosphate, tri-n-butylphosphine, triisopropylphosphine, tricyclohexylphosphine, triphenyl phosphite, phenyl phosphonate, triphenylphosphine, diphenylphosphine and the like; secondary amines such as tri-n-butylamine, benzylmethylamine, methylaniline and the like; tertiary amines such as triethylamine, tri-n-propylamine, triisopropylamine, tri-n-butylamine, diethylisopropylamine, benzyldimethylamine, N,N-dimethylaniline, N,N,N',N'-tetramethylethylenediamine and the like; cyclic amines such as pyrrolidine, N-methylpyrrolidine, piperidine, N-methyl piperidine, morpholine, N-methylmorpholine, piperazine, N,N'-dimethylpiperazine, 1,4-diazabicyclo[2.2.2]octane, 1,5-diazabicyclo[4.3.0]nona-5-ene, 1,8-diazabicyclo[5.4.0]undeca-7-ene and the like; imidazoles such as imidazole, 1-methyl imidazole, 2-methylimidazole, 4-methylimidazole, 1-ethyl imidazole, 2-ethylimidazole, 4-ethylimidazole, 1-isopropyl imidazole, 2-isopropylimidazole, 4-isopropylimidazole, 2-undecylimidazole, 2-heptadecylimidazole, 1-phenylimidazole, 2-phenylimidazole, 4-phenylimidazole, 2,4-dimethylimidazole, 2,4-diethylimidazole, 2,4-diisopropylimidazole, 2,4-diphenylimidazole, 2-ethyl-4-methylimidazole, 1-benzyl-2-methylimidazole, 1-cyanoethyl-2-methylimidazole, benzimidazole, 2-methylimidazoline, 2-undecylimidazoline, 2-heptadecyl imidazoline and the like; quaternary ammonium salts such as tetra-n-butylammonium chloride, tetra-n-butylammonium bromide, tetra-n-butylammonium iodide, benzyltrimethylammonium chloride, benzyltrimethylammonium bromide, benzyltrimethyl ammonium iodide and the like. The above compounds can be used alone or in combination of two or more kinds thereof.

Further, the carboxylic acid-modified phenoxy resin of the component (A) may contain, if necessary, an ethylenically unsaturated group at a side chain. A composition and a synthetic method thereof shall not specifically be restricted, and a compound having at least one ethylenically unsaturated group and one functional group such as an epoxy group, an oxetanyl group, an isocyanate group, a hydroxy group, a carboxy group and the like can be subjected to addition reaction or condensation reaction with the carboxylic acid-modified phenoxy resin (A) described above to introduce the ethylenically unsaturated group into a side chain thereof.

The above compounds shall not specifically be restricted and include compounds having an ethylenically unsaturated group and an epoxy group, such as glycidyl (meth)acrylate, α-ethylglycidyl (meth)acrylate, α-n-propylglycidyl (meth)acrylate, α-n-butylglycidyl (meth)acrylate, 2-methylglycidyl (meth)acrylate, 2-ethylglycidyl (meth)acrylate, 2-propylglycidyl (meth)acrylate, 3,4-epoxybutyl (meth)acrylate, 3,4-epoxyheptylglycidyl (meth)acrylate, α-ethyl-6,7-epoxyheptyl (meth)acrylate, 3,4-epoxycyclohexylmethyl (meth)acrylate, o-vinylbenzyl glycidyl ether, m-vinylbenzyl glycidyl ether, p-vinylbenzyl glycidyl ether and the like; compounds having an ethylenically unsaturated group and an oxetanyl group, such as (2-ethyl-2-oxetanyl)methyl (meth)acrylate, (2-methyl-2-oxetanyl)methyl (meth)acrylate, 2-(2-ethyl-2-oxetanyl)ethyl (meth)acrylate, 2-(2-methyl-2-oxetanyl)ethyl (meth)acrylate, 3-(2-ethyl-2-oxetanyl)propyl (meth)acrylate, 3-(2-methyl-2-oxetanyl)propyl (meth)acrylate and the like; compounds having an ethylenically unsaturated group and an isocyanate group, such as ethyl isocyanate (meth)acrylate and the like; compounds having an ethylenically unsaturated group and a hydroxy group, such as 2-hydroxyethyl (meth)acrylate, 2-hydroxypropyl (meth)acrylate, 3-chloro-2-hydroxypropyl (meth)acrylate, 2-hydroxybutyl (meth)acrylate and the like; and compounds having an ethylenically unsaturated group and a carboxy group, such as (meth)acrylic acid, crotonic acid, cinnamic acid, (2-(meth)acryloyloxyethyl) succinate, 2-phthaloylethyl (meth)acrylate, 2-tetrahydrophthaloylethyl (meth)acrylate, 2-hexahydrophthaloylethyl (meth)acrylate, ω-carboxy-polycaprolactone mono(meth)acrylate, 3-vinylbenzoic acid, 4-vinylbenzoic acid and the like.

In this connection, (meth)acrylate means acrylate and/or methacrylate.

Among them, preferred from the viewpoints of a transparency and a reactivity are compounds having an ethylenically unsaturated group and an epoxy group, such as glycidyl (meth)acrylate, 3,4-epoxycyclohexylmethyl (meth)acrylate and the like; compounds having an ethylenically unsaturated group and an isocyanate group, such as ethyl isocyanate (meth)acrylate and the like; compounds having an ethylenically unsaturated group and a hydroxy group, such as 2-hydroxyethyl (meth)acrylate, 2-hydroxypropyl (meth)acrylate, 3-chloro-2-hydroxypropyl (meth)acrylate, 2-hydroxybutyl (meth)acrylate and the like; and compounds having an ethylenically unsaturated group and a carboxy group, such as (meth)acrylic acid, crotonic acid, 2-hexahydrophthaloylethyl (meth)acrylate and the like. The above compounds can be used alone or in combination of two or more kinds thereof.

A weight average molecular weight of the carboxylic acid-modified phenoxy resin of the component (A) is preferably 1,000 to 300,000. If it is 1,000 or more, the molecular weight is large, and therefore the resin composition prepared is provided with a sufficiently large strength. If it is 3,000,000 or less, the solubility in a developer comprising an alkaline aqueous solution and the compatibility with the polymerizable compound of the component (B) are good. From the viewpoints described above, the weight average molecular weight is more preferably 3,000 to 2,000,000, particularly preferably 5,000 to 1,000,000. The weight average molecular weight in the present invention is a value measured by gel permeation chromatography (GPC) and reduced to standard polystyrene.

An acid value of the carboxylic acid-modified phenoxy resin of the component (A) can be prescribed so that it can be developed by various publicly known developers in a step in which a layer of a light-sensitive resin composition is selectively removed by development described later to form a pattern.

When development is carried out by using an alkaline aqueous solution of, for example, sodium carbonate, potassium carbonate, tetramethylammonium hydroxide, triethanolamine and the like, the acid value is preferably 20 to 300 mg KOH/g. If it is 20 mg KOH/g or more, the development is easy, and if it is 300 mg KOH/g or less, the developer resistance is not reduced. From the viewpoints described above, the acid value is more preferably 30 to 250 mg KOH/g, particularly preferably 40 to 200 mg KOH/g.

When development is carried out by using water or an alkaline aqueous solution comprising an alkaline aqueous solution and at least one organic solvent, the acid value is preferably 10 to 250 mg KOH/g. If the acid value is 10 mg KOH/g or more, the development is easy, and if it is 250 mg KOH/g or less, the developer resistance is not reduced. From the viewpoints described above, the acid value is more preferably 20 to 200 mg KOH/g, particularly preferably 30 to 150 mg KOH/g.

A blend amount of the carboxylic acid-modified phenoxy resin of the component (A) is preferably 10 to 85% by mass based on the total amount of the component (A) and the component (B). If it is 10% by mass or more, the development can be carried out by various publicly known developers in a step in which a layer of a light-sensitive resin composition is selectively removed by development described later to form a pattern. If it is 85% by mass or less, the component (A) is entwined by the component (B) in exposure and readily cured, and the developer resistance is not reduced. From the viewpoints described above, the blend amount is more preferably 20 to 80% by mass, particularly preferably 25 to 75% by mass.

The component (B) used in the present invention shall be explained below.

The polymerizable compound of the component (B) used in the present invention shall not specifically be restricted as long as it is cured by heating or irradiating with a UV ray and the like, and it includes, for example, compounds containing an ethylenically unsaturated group. To be specific, it includes (meth)acrylates, vinylidene halides, vinyl ethers, vinyl esters, vinylpyridine, vinylamides, arylated vinyls and the like. Among them, (meth)acrylates and arylated vinyls are preferably used from the viewpoint of a transparency. Any of monofunctional compounds, difunctional compounds and polyfunctional compounds which are not lower than trifunctional can be used as the (meth)acrylates.

The monofunctional (meth)acrylate includes, for example, aliphatic (meth)acrylates such as methyl (meth)acrylate, ethyl (meth)acrylate, butyl (meth)acrylate, isobutyl (meth)acrylate, tert-butyl (meth)acrylate, butoxyethyl (meth)acrylate, isoamyl (meth)acrylate, hexyl (meth)acrylate, 2-ethylhexyl (meth)acrylate, heptyl (meth)acrylate, octyl (meth)acrylate, nonyl (meth)acrylate, decyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, stearyl (meth)acrylate, vehenyl (meth)acrylate, 2-hydroxyethyl (meth)acrylate, 2-hydroxypropyl (meth)acrylate, 3-chloro-2-hydroxypropyl (meth)acrylate, 2-hydroxybutyl (meth)acrylate, methoxypolyethylene glycol (meth)acrylate, ethoxypolyethylene glycol (meth)acrylate, methoxypolypropylene glycol (meth)acrylate, ethoxypolypropylene glycol (meth)acrylate, mono(2-(meth)acryloyloxyethyl) succinate and the like; alicyclic (meth)acrylates such as cyclopentyl (meth)acrylate, cyclohexyl (meth)acrylate, 2-tetrahydrofuryl (meth)acrylate, dicyclopentanyl (meth)acrylate, dicyclopentenyl (meth)acrylate, isobornyl (meth)acrylate, mono(2-(meth)acryloyloxyethyl) tetrahydrophthalate, mono(2-(meth)acryloyloxyethyl) hexahydrophthalate and the like; aromatic (meth)acrylates such as benzyl (meth)acrylate, phenyl (meth)acrylate, o-biphenyl (meth)acrylate, 1-naphthyl (meth)acrylate, 2-naphthyl (meth)acrylate, phenoxyethyl (meth)acrylate, p-cumylphenoxy ethyl (meth)acrylate, o-phenylphenoxyethyl (meth)acrylate, 1-naphthoxyethyl (meth)acrylate, 2-naphthoxyethyl (meth)acrylate, 2-(meth)acryloxyethyl-N-carbazole, phenoxypolyethylene glycol (meth)acrylate, nonylphenoxypolyethylene glycol (meth)acrylate, phenoxypolypropylene glycol (meth)acrylate, 2-hydroxy-3-phenoxypropyl (meth)acrylate, 2-hydroxy-3-(o-phenylphenoxy)propyl (meth)acrylate, 2-hydroxy-3-(1-naphthoxy)propyl (meth)acrylate, 2-hydroxy-3-(2-naphthoxy)propyl (meth)acrylate, mono(2-(meth)acryloyloxyethyl)phthalate and the like; and caprolactone-modified compounds thereof.

Among them, preferred from the viewpoints of a transparency and a heat resistance are the alicyclic (meth)acrylates described above; and the aromatic (meth)acrylates such as benzyl (meth)acrylate, phenyl (meth)acrylate, o-biphenyl (meth)acrylate, 1-naphthyl (meth)acrylate, 2-naphthyl (meth)acrylate, phenoxyethyl (meth)acrylate, p-cumylphenoxyethyl (meth)acrylate, o-phenylphenoxyethyl (meth)acrylate, 1-naphthoxyethyl (meth)acrylate, 2-naphthoxyethyl (meth)acrylate, 2-(meth)acryloxyethyl-N-carbazole, 2-hydroxy-3-phenoxypropyl (meth)acrylate, 2-hydroxy-3-(o-phenylphenoxy)propyl (meth)acrylate, 2-hydroxy-3-(1-naphthoxy)propyl (meth)acrylate, 2-hydroxy-3-(2-naphthoxy)propyl (meth)acrylate, mono(2-(meth)acryloyloxyethyl)phthalate and the like.

The difunctional (meth)acrylate includes, for example, aliphatic (meth)acrylates such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, ethoxylated polypropylene glycol di(meth)acrylate, 1,3-butanediol di(meth)acrylate, 1,4-butanediol di(meth)acrylate, neopentyl glycol di(meth)acrylate, 3-methyl-1,5-pentanediol di(meth)acrylate, 1,6-hexanediol di(meth)acrylate, 2-butyl-2-ethyl-1,3-propanediol di(meth)acrylate, 1,9-nonanediol di(meth)acrylate, 1,10-decanediol di(meth)acrylate, glycerin di(meth)acrylate, ethoxylated 2-methyl-1,3-propanediol di(meth)acrylate and the like; alicyclic (meth)acrylates such as cyclohexanedimethanol (meth)acrylate, ethoxylated cyclohexanedimethanol (meth)acrylate, propoxylated cyclohexanedimethanol (meth)acrylate, ethoxylated propoxylated cyclohexanedimethanol (meth)acrylate, tricyclodecanedimethanol (meth)acrylate, ethoxylated tricyclodecanedimethanol (meth)acrylate, propoxylated tricyclodecanedimethanol (meth)acrylate, ethoxylated propoxylated tricyclodecanedimethanol (meth)acrylate, ethoxylated hydrogenated bisphenol A di(meth)acrylate, propoxylated hydrogenated bisphenol A di(meth)acrylate, ethoxylated propoxylated hydrogenated bisphenol A di(meth)acrylate, ethoxylated hydrogenated bisphenol F di(meth)acrylate, propoxylated hydrogenated bisphenol F di(meth)acrylate, ethoxylated propoxylated hydrogenated bisphenol F di(meth)acrylate and the like; aromatic (meth)acrylates such as ethoxylated bisphenol A di(meth)acrylate, propoxylated bisphenol A di(meth)acrylate, ethoxylated propoxylated bisphenol A di(meth)acrylate, ethoxylated bisphenol F di(meth)acrylate, propoxylated bisphenol F di(meth)acrylate, ethoxylated propoxylated bisphenol F di(meth)acrylate, ethoxylated bisphenol AF di(meth)acrylate, propoxylated bisphenol AF di(meth)acrylate, ethoxylated propoxylated bisphenol AF di(meth)acrylate, ethoxylated fluorene type di(meth)acrylate, propoxylated fluorene type di(meth)acrylate, ethoxylated propoxylated fluorene type di(meth)acrylate and the like; caprolactone-modified compounds thereof; aliphatic epoxy (meth)acrylates such as neopentyl glycol type epoxy (meth)acrylate and the like; alicyclic epoxy (meth)acrylates such as cyclohexanedimethanol type epoxy (meth)acrylate, hydrogenated bisphenol A type epoxy (meth)acrylate, hydrogenated bisphenol F type epoxy (meth)acrylate and the like; and aromatic epoxy (meth)acrylates such as resorcinol type epoxy (meth)acrylate, bisphenol A type epoxy (meth)acrylate, bisphenol F type epoxy (meth)acrylate, bisphenol AF type epoxy (meth)acrylate, fluorene type epoxy (meth)acrylate and the like.

Among them, the alicyclic (meth)acrylates, the aromatic (meth)acrylates, the alicyclic epoxy (meth)acrylates and the aromatic epoxy (meth)acrylates each described above are preferred from the viewpoints of a transparency and a heat resistance.

The polyfunctional(meth)acrylate which are higher than trifunctional includes, for example, aliphatic (meth)acrylates such as trimethylolpropane tri(meth)acrylate, ethoxylated trimethylolpropane tri(meth)acrylate, propoxylated trimethylolpropane tri(meth)acrylate, ethoxylated propoxylated trimethylolpropane tri(meth)acrylate, pentaerythritol tri(meth)

acrylate, ethoxylated pentaerythritol tri(meth)acrylate, propoxylated pentaerythritol tri(meth)acrylate, ethoxylated propoxylated pentaerythritol tri(meth)acrylate, pentaerythritol tetra(meth)acrylate, ethoxylated pentaerythritol tetra(meth)acrylate, propoxylated pentaerythritol tetra(meth)acrylate, ethoxylated propoxylated pentaerythritol tetra(meth)acrylate, ditrimethylolpropane tetraacrylate, dipentaerythritol hexa(meth)acrylate and the like; heterocyclic (meth)acrylates such as ethoxylated isocyanuric acid tri(meth)acrylate, propoxylated isocyanuric acid tri(meth)acrylate, ethoxylated propoxylated isocyanuric acid tri(meth)acrylate and the like; caprolactone-modified compounds thereof; and aromatic epoxy (meth)acrylates such as phenol novolak type epoxy (meth)acrylate, cresol novolak type epoxy (meth)acrylate and the like.

Among them, preferred from the viewpoints of a transparency and a heat resistance are heterocyclic (meth)acrylates such as ethoxylated isocyanuric acid tri(meth)acrylate, propoxylated isocyanuric acid tri(meth)acrylate, ethoxylated propoxylated isocyanuric acid tri(meth)acrylate and the like and aromatic epoxy (meth)acrylates such as phenol novolak type epoxy (meth)acrylate, cresol novolak type epoxy (meth)acrylate and the like. The above compounds can be used alone or in combination of two or more kinds thereof, and they can be used as well in combination with other polymerizable compounds.

Also, at least one of compounds containing at least one selected from the group consisting of an alicyclic structure, an aryl group, an aryloxy group and an aralkyl group and an ethylenically unsaturated group in a molecule thereof is preferably used as the polymerizable compound of the component (B) from the viewpoint of a heat resistance. To be specific, it includes (meth)acrylate or N-vinylcarbazole containing at least one selected from the group consisting of an alicyclic structure, an aryl group, an aryloxy group and an aralkyl group. The aryl group represents an aromatic hydrocarbon group such as a phenyl group, a naphthyl group and the like and an aromatic heterocyclic group such as a carbazole group and the like.

To be more specific, at least one of compounds represented by the following Formulas (3) to (6) is preferably used as the polymerizable compound of the component (B). Alternatively, at least one of compounds represented by the following Formulas (3) to (6) and containing an aryl group and an ethylenically unsaturated group is preferably used as the polymerizable compound of the component (B):

[Formula 15]

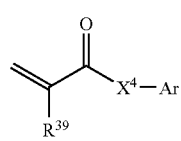

(3)

(wherein Ar represents any monovalent group of:

[Formula 16]

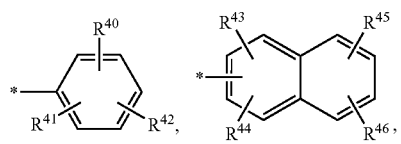

-continued

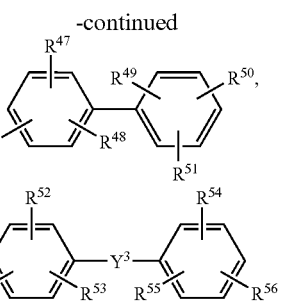

$X^4$ represents an oxygen atom, a sulfur atom or any divalent group of $OCH_2$, $SCH_2$, $O(CH_2CH_2O)_c$, $O[CH_2CH_2(CH_3)O]_d$ and $OCH_2CH(OH)CH_2O$;

$Y^3$ represents any divalent group of:

[Formula 17]

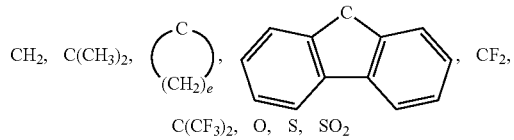

$R^{39}$ represents any of a hydrogen atom and methyl; $R^{40}$ to $R^{56}$ each represent independently any of a hydrogen atom, a fluorine atom, an organic group having 1 to 20 carbon atoms and a fluorine-containing organic group having 1 to 20 carbon atoms; c and d each represent independently an integer of 1 to 20, and e represents an integer of 2 to 10);

[Formula 18]

(4)

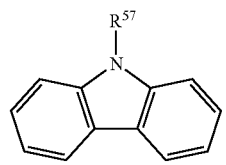

(wherein $R^{57}$ represents:

[Formula 19]

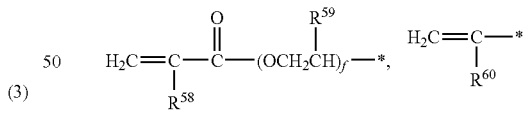

$R^{58}$ to $R^{60}$ each represent independently any of a hydrogen atom and methyl; and f represents an integer of 1 to 10);

[Formula 20]

(5)

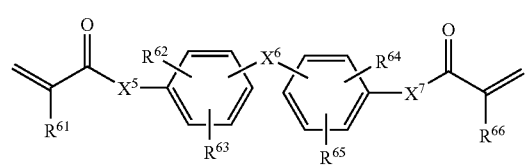

(wherein $X^5$ and $X^7$ each represent independently an oxygen atom, a sulfur atom or any divalent group of $O(CH_2CH_2O)_g$ and $O[CH_2CH_2(CH_3)O]_h$;
$X^6$ represents any divalent group of:

[Formula 21]

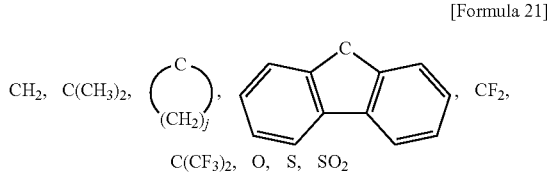

$R^{61}$ and $R^{66}$ each represent independently any of a hydrogen atom and methyl; $R^{62}$ to $R^{65}$ each represent independently any of a hydrogen atom, a fluorine atom, an organic group having 1 to 20 carbon atoms and a fluorine-containing organic group having 1 to 20 carbon atoms; g and h each represent independently an integer of 1 to 20, and i represents an integer of 2 to 10); and

[Formula 22]

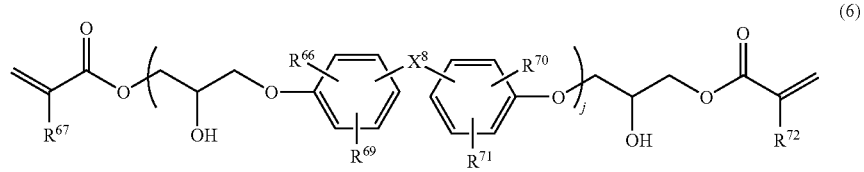

(6)

(wherein $X^8$ represents any divalent group of:

[Formula 23]

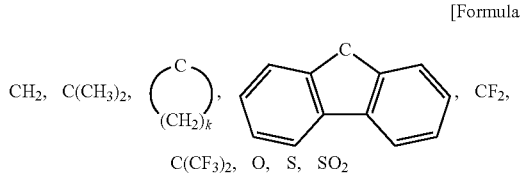

$R^{67}$ and $R^{72}$ each represent independently any of a hydrogen atom and methyl; $R^{68}$ to $R^{71}$ each represent independently any of a hydrogen atom, a fluorine atom, an organic group having 1 to 20 carbon atoms and a fluorine-containing organic group having 1 to 20 carbon atoms; j represents an integer of 1 to 5, and k represents an integer of 2 to 10).

The organic groups in Formulas (3) to (6) include the same examples as explained in Formulas (1) and (2).

The preferred polymerizable compound of the component (B) includes as well compounds having two or more epoxy groups in a molecule thereof in addition to the (meth)acrylates from the viewpoint of a compatibility thereof with the carboxylic acid-modified phenoxy resin of the component (A).

To be specific, they include difunctional phenol glycidyl ethers such as bisphenol A type epoxy resins, tetrabromobisphenol A type epoxy resins, bisphenol F type epoxy resins, bisphenol AF type epoxy resins, bisphenol AD type epoxy resins, biphenyl type epoxy resins, naphthalene type epoxy resins, fluorene type epoxy resins and the like; hydrogenated difunctional phenol glycidyl ethers such as hydrogenated bisphenol A type epoxy resins, hydrogenated bisphenol F type epoxy resins, hydrogenated 2,2'-biphenol type epoxy resins, hydrogenated 4,4'-biphenol type epoxy resins and the like; polyfunctional phenol glycidyl ethers such as phenol novolak type epoxy resins, cresol novolak type epoxy resins, dicyclopentadiene-phenol type epoxy resins, tetraphenylolethane type epoxy resins and the like; difunctional aliphatic alcohol glycidyl ethers such as polyethylene glycol type epoxy resins, polypropylene glycol type epoxy resins, neopentyl glycol type epoxy resins, 1,6-hexanediol type epoxy resins and the like; difunctional alicyclic alcohol glycidyl ethers such as cyclohexanedimethanol type epoxy resins, tricyclodecanedimethanol type epoxy resins and the like; polyfunctional aliphatic alcohol glycidyl ethers such as trimethylolpropane type epoxy resins, sorbitol type epoxy resins, glycerin type epoxy resins and the like; difunctional aromatic glycidyl esters such as diglycidyl phthalate and the like; difunctional alicyclic glycidyl esters such as diglycidyl tetrahydrophthalate, diglycidyl hexahydrophthalate and the like; difunctional aromatic glycidylamines such as N,N-diglycidylaniline, N,N-diglycidyltrifluoromethylaniline and the like; polyfunctional aromatic glycidylamines such as N,N,N', N'-tetraglycidyl-4,4-diaminodiphenylmethane, 1,3-bis(N,N-glycidylaminomethyl)cyclohexane, N,N,O-triglycidyl-p-aminophenol and the like; difunctional alicyclic epoxy resins such as alicyclic diepoxy acetal, alicyclic diepoxy adipate, alicyclic diepoxy carboxylate, vinyl cyclohexene dioxide and the like; polyfunctional alicyclic epoxy resins such as 1,2-epoxy-4-(2-oxiranyl)cyclohexane adducts of 2,2-bis(hydroxymethyl)-1-butanol and the like; polyfunctional heterocyclic epoxy resins such as triglycidyl isocyanurate and the like; and difunctional or polyfunctional silicon-containing epoxy resins such as organopolysiloxane type epoxy resins and the like.

Among them, preferred from the viewpoints of a transparency and a heat resistance are the difunctional phenol glycidyl ethers such as bisphenol A type epoxy resins, bisphenol F type epoxy resins, bisphenol AF type epoxy resins, bisphenol AD type epoxy resins, biphenyl type epoxy resins, naphthalene type epoxy resins and fluorene type epoxy resins; the hydrogenated difunctional phenol glycidyl ethers described above; the polyfunctional phenol glycidyl ethers described above; the difunctional alicyclic alcohol glycidyl ethers described above; the difunctional aromatic glycidyl esters described above; the difunctional alicyclic glycidyl esters described above; the difunctional alicyclic epoxy resins described above; the polyfunctional alicyclic epoxy resins described above; the polyfunctional heterocyclic epoxy resins described above; and the difunctional or polyfunctional silicon-containing epoxy resins described above. The above compounds can be used alone or in combination of two or more kinds thereof, and they can be used as well in combination with other polymerizable compounds.

A blend amount of the polymerizable compound of the component (B) is preferably 15 to 90 mass % based on the total amount of the component (A) and the component (B). If it is 15 mass % or more, the component (B) entwines therein the carboxylic acid-modified phenoxy resin of the component (A) and is readily cured, and the developer resistance is not short. If it is 90 mass % or less, the development is facilitated. From the viewpoints described above, the blend amount is more preferably 20 to 80 mass %, particularly preferably 25 to 75 mass %.

The polymerization initiator (C) used in the present invention shall be explained below.

The polymerization initiator (C) used in the present invention shall not specifically be restricted as long as it initiates polymerization by heat or irradiation with a UV ray and the like, and when a compound having an ethylenically unsaturated group is used as the polymerizable compound of the component (B), the polymerization initiator (C) includes, for example, heat radical polymerization initiators, photoradical polymerization initiators and the like. The photoradical polymerization initiators are preferably used since they provide a rapid curing rate and make curing at room temperature possible.

The heat radical polymerization initiators include, for example, ketone peroxides such as methyl ethyl ketone peroxide, cyclohexanone peroxide, methylcyclohexanone peroxide and the like; peroxy ketals such as 1,1-bis(t-butylperoxy)cyclohexane, 1,1-bis(t-butylperoxy)-2-methylcyclohexane, 1,1-bis(t-butylperoxy)-3,3,5-trimethylcyclohexane, 1,1-bis(t-hexylperoxy)cyclohexane, 1,1-bis(t-hexylperoxy)-3,3,5-trimethylcyclohexane and the like; hydroperoxides such as p-menthane hydroperoxide and the like; dialkyl peroxides such as α,α'-bis(t-butylperoxy) diisopropylbenzene, dicumyl peroxide, t-butylcumyl peroxide, di-t-butyl peroxide and the like; diacyl peroxides such as octanoyl peroxide, lauroyl peroxide, stearyl peroxide, benzoyl peroxide and the like; peroxy carbonates such as bis(4-t-butylcyclohexyl)peroxy dicarbonate, di-2-ethoxyethylperoxy dicarbonate, di-2-ethylhexylperoxy dicarbonate, di-3-methoxybutylperoxy carbonate and the like; peroxy esters such as t-butylperoxy pivalate, t-hexylperoxy pivalate, 1,1,3,3-tetramethylbutylperoxy 2-ethylhexanoate, 2,5-dimethyl-2,5-bis(2-ethylhexanoylperoxy)hexane, t-hexyl peroxy 2-ethylhexanoate, t-butylperoxy 2-ethylhexanoate, t-butylperoxy isobutyrate, t-hexylperoxy isopropyl monocarbonate, t-butylperoxy-3,5,5-trimethyl hexanoate, t-butylperoxy laurate, t-butylperoxy isopropyl monocarbonate, t-butylperoxy 2-ethylhexyl monocarbonate, t-butylperoxy benzoate, t-hexyl peroxy benzoate, 2,5-dimethyl-2,5-bis(benzoylperoxy)hexane, t-butylperoxy acetate and the like; and azobisoalkylnitriles such as 2,2'-azobisisobutyronitrile, 2,2'-azobis(2,4-dimethylvaleronitrile), 2,2'-azobis(4-methoxy-2'-dimethyl valeronitrile) and the like.

Among them, preferred from the viewpoints of a curing property, a transparency and a heat resistance are the diacyl peroxides such as octanoyl peroxide, lauroyl peroxide, stearyl peroxide, benzoyl peroxide and the like; the peroxy esters such as 1,1,3,3-tetramethylbutylperoxy 2-ethylhexanoate, 2,5-dimethyl-2,5-bis(2-ethylhexanoylperoxy)hexane, t-hexylperoxy 2-ethylhexanoate, t-butylperoxy 2-ethylhexanoate, t-butyl peroxy isobutyrate, t-hexylperoxy isopropyl monocarbonate, t-butylperoxy-3,5,5-trimethyl hexanoate, t-butylperoxy laurate, t-butylperoxy isopropyl monocarbonate, t-butylperoxy 2-ethylhexyl monocarbonate, t-butylperoxy benzoate, t-hexylperoxy benzoate, 2,5-dimethyl-2,5-bis(benzoylperoxy)hexane, t-butylperoxy acetate and the like; and the azo compounds such as 2,2'-azobisisobutyronitrile, 2,2'-azobis(2,4-dimethylvaleronitrile, 2,2'-azobis (4-methoxy-2'-dimethylvaleronitrile) and the like.

The photoradical polymerization initiators include, for example, benzoin ketals such as 2,2-dimethoxy-1,2-diphenylethane-1-one and the like; α-hyroxyketones such as 1-hydroxycyclohexyl phenyl ketone, 2-hydroxy-2-methyl-1-phenylpropane-1-one, 1-[4-(2-hydroxyethoxy)phenyl]-2-hydroxy-2-methyl-1-propane-1-one and the like; α-amionoketone such as 2-benzyl-2-dimethylamino-1-(4-morpholinophenyl)-butane-1-one, 1,2-methyl-1-[4-(methylthio)phenyl]-2-morpholinopropane-1-one and the like; oxime esters such as 1-[(4-phenylthio)phenyl]-1,2-octanedione-2-(benzoyl)oxime and the like; phosphine oxides such as bis(2,4,6-trimethylbenzoyl)phenylphosphine oxide, bis(2,6-dimethoxybenzoyl)-2,4,4-trimethylpentylphosphine oxide, 2,4,6-trimethylbenzoyldiphenylphosphine oxide and the like; 2,4,5-triarylimidazole dimers such as 2-(o-chlorophenyl)-4,5-diphenylimidazole dimer, 2-(o-chlorophenyl)-4,5-di(methoxyphenyl)imidazole dimer, 2-(o-fluorophenyl)-4,5-diphenylimidazole dimer, 2-(o-methoxyphenyl)-4,5-diphenyl imidazole dimer, 2-(p-methoxyphenyl)-4,5-diphenylimidazole dimer and the like; benzophenones such as benzophenone, N,N'-tetramethyl-4,4'-diaminobenzophenone, N,N'-tetraethyl-4,4'-diaminobenzophenone, 4-methoxy-4'-dimethylaminobenzophenone and the like; quinones such as 2-ethylanthraquinone, phenanthrenequinone, 2-tert-butylanthraquinone, octamethyl anthraquinone, 1,2-benzanthraquinone, 2,3-benzanthraquinone, 2-phenylanthraquinone, 2,3-diphenylanthraquinone, 1-chloro anthraquinone, 2-methylanthraquinone, 1,4-naphthoquinone, 9,10-phenanthraquinone, 2-methyl-1,4-naphthoquinone, 2,3-dimethylanthraquinone and the like; benzoin ethers such as benzoin methyl ether, benzoin ethyl ether, benzoin phenyl ether and the like; benzoins such as benzoin, methylbenzoin, ethylbenzoin and the like; benzyls such as benzyl dimethyl ketal and the like; acridines such as 9-phenylacridine, 1,7-bis(9,9'-acridinylheptane) and the like; N-phenylglycine, coumarin and the like.

Further, in the 2,4,5-triarylimidazole dimer described above, two triarylimidazole sites may have the same substituents on the aryl groups to provide the symmetric compound or may have different substituents on the aryl groups to provide the asymmetric compound. As is the case with combination of diethylthioxanthone and dimethylaminobenzoic acid, thioxanthones and tertiary amines may be combined.

Among them, the α-hyroxyketones and the phosphine oxides each described above are preferred from the viewpoints of a curing property, a transparency and a heat resistance. The above heat and photoradical polymerization initiators can be used alone or in combination of two or more kinds thereof. Further, they can be used in combination with suited sensitizers.

When an epoxy resin is used as the polymerizable compound of the component (B), the polymerization initiator of the component (C) includes, for example, heat cationic polymerization initiators, photocationic polymerization initiators and the like. The photocationic polymerization initiators are preferably used since they provide a rapid curing rate and make curing at room temperature possible.

The heat cationic polymerization initiators include, for example, bezylsulfonium salts such as p-alkoxyphenylbezylmethylsulfonium hexafluoroantimonate and the like; pyridinium salts such as benzyl-p-cyanopyridinium hexafluoroantimonate, 1-naphthylmethyl-o-cyanopyridinium hexafluoroantimonate, cinnamyl-o-cyanopyridinium hexafluoroantimonat and the like; and bezylammonium salts such as bezyldimethylphenylammonium hexafluoroantimonat and the like. Among them, the bezylsulfonium salts such as p-alkoxyphenylbezylmethylsulfonium hexafluoroantimonate and the like are preferred from the viewpoints of a curing property, a transparency and a heat resistance.

The photocationic polymerization initiators include, for example, aryldiazonium salts such as p-methoxybenzenediazonium hexafluorophosphate and the like; diaryliodonium salts such as diphenyliodonium hexafluorophosphate, diphenyliodonium hexafluoroantimonate and the like; triarylsulfonium salts such as triphenylsulfonium hexafluorophosphate, triphenylsulfonium hexafluoroantimonate, diphenyl-4-thiophenoxyphenylsulfonium hexafluorophosphate, diphenyl-4-thiophenoxyphenylsulfonium hexafluoroantimonate, diphenyl-4-thiophenoxyphenylsulfonium pentafluorohydroxyantimonate and the like; triallylselenonium salts such as triphenylselenonium hexafluorophosphate, triphenylselenonium hexafluoroborate, triphenylselenonium hexafluoroantimonate and the like; dialkylphenacylsulfonium salts such as dimethylphenacylsulfonium hexafluoroantimonate, diethylphenacylsulfonium hexafluoroantimonate and the like; dialkyl-4-hydroxy salts such as 4-hydroxyphenyldimethyl sulfonium hexafluoroantimonate, 4-hydroxyphenylbenzylmethyl sulfonium hexafluoroantimonate and the like; and sulfonic acid esters such as α-hydroxymethylbenzoinsulfonates, N-hydroxy imidosulfonates, α-sulfonyloxyketone, β-sulfonyloxyketone and the like.

Among them, they are preferably the triarylsulfonium salts described above from the viewpoints of a curing property, a transparency and a heat resistance. The above heat and photoradical polymerization initiators can be used alone or in combination of two or more kinds thereof. Further, they can be used in combination with suited sensitizers.

A blend amount of the polymerization initiator the component (C) is preferably 0.1 to 10 parts by mass based on the total amount 100 parts by mass of the component (A) and the component (B). If it is 0.1 part by mass or more, curing is satisfactory, and if it is 10 parts by mass or less, the sufficiently high light transmittance is obtained. From the viewpoints described above, the blending amount is more preferably 0.3 to 7 parts by mass, particularly preferably 0.5 to 5 parts by mass.

Further, in addition thereto, so-called additives such as antioxidants, yellowing preventives, UV absorbers, visible light absorbers, coloring agents, plasticizers, stabilizers, fillers and the like may be added, if necessary, to the resin composition for forming optical parts according to the present invention in a proportion in which an adverse influence is not exerted to the effects of the present invention.

The resin composition for an optical material according to the present invention shall be explained below.

The resin composition for an optical material according to the present invention may be diluted with a suited organic solvent and used in the form of a resin varnish for an optical material. The organic solvent used above shall not specifically be restricted as long as it can dissolve the above resin composition and includes, for example, tetrahydrofuran, methanol, ethanol, isopropanol, acetone, methyl ethyl ketone, methyl isobutyl ketone, cyclohexanone, ethyl acetate, butyl acetate, γ-butyrolactone, methyl lactate, ethyl lactate, methyl cellosolve, ethyl cellosolve, butyl cellosolve, ethyl cellosolve acetate, propylene glycol monomethyl ether, propylene glycol monomethyl ether acetate, toluene, xylene, N,N-dimethylformamide, N,N-dimethylacetamide, N-methylpyrrolidone and the like.

Among them, methyl ethyl ketone, methyl isobutyl ketone, cyclohexanone, methyl lactate, ethyl lactate, ethyl cellosolve, propylene glycol monomethyl ether, propylene glycol monomethyl ether acetate, toluene, xylene and N,N-dimethylacetamide are preferred from the viewpoints of a solubility and a boiling point. The above organic solvents can be used alone or in combination of two or more kinds thereof. Usually, a solid matter concentration thereof in the resin varnish is preferably 20 to 80 mass %.

In preparing the resin varnish for an optical material, it is mixed preferably by stirring. The stirring method shall not specifically be restricted, and stirring carried out by using a propeller is preferred from the viewpoint of a stirring efficiency. A rotating speed of the propeller in stirring shall not specifically be restricted, and it is preferably 10 to 1,000 rpm. If it is 10 rpm or more, the respective components of the components (A) to (C) and the organic solvent are sufficiently mixed, and if it is 1,000 rpm or less, air bubbles produced by rotation of the propeller are less mixed in. From the viewpoints described above, the rotating speed is more preferably 50 to 800 rpm, particularly preferably 100 to 500 rpm. The stirring time shall not specifically be restricted, and it is preferably 1 to 24 hours. If it is 1 hour or longer, the respective components of the components (A) to (C) and the organic solvent are sufficiently mixed, and if it is 24 hours or shorter, time for preparing the varnish can be shortened.

The resin varnish for an optical material prepared is preferably filtrated through a filter having a pore diameter of 50 μm or less. If the pore diameter is 50 μm or less, large foreign matters are removed, and cissing is not caused in coating the varnish. Further, light transmitted through the core part is prevented from being scattered. From the viewpoints described above, the resin varnish is filtrated through the filter having a pore diameter of more preferably 30 μm or less, particularly preferably 10 μm or less.

The resin varnish for an optical material prepared is preferably defoamed under reduced pressure. The defoaming method shall not specifically be restricted, and a vacuum pump and a bell jar and a deforming apparatus equipped with a vacuum device can be used as the specific examples thereof. The pressure in the pressure reduction shall not specifically be restricted, and pressure at which the organic solvent contained in the resin varnish is not boiled is preferred. The time for defoaming under reduced pressure shall not specifically be restricted, and it is preferably 3 to 60 minutes. If it is 3 minutes or longer, air bubbles dissolved in the resin varnish can be removed, and if it is 60 minutes or shorter, the solvent contained in the resin varnish is inhibited from being volatized.

A cured film prepared by polymerizing and curing the resin composition for an optical material comprising (A) the carboxylic acid-modified phenoxy resin, (B) the polymerizable compound and (C) the polymerization initiator according to the present invention has preferably a refractive index of 1.400 to 1.700 at 25° C. and a wavelength of 830 nm. If it is 1.400 to 1.700, it is not different from a refractive index of conventional optical resins to a large extent, and therefore a general versatility thereof as an optical material is not damaged. From the viewpoints described above, the refractive index is more preferably 1.425 to 1.675, particularly preferably 1.450 to 1.650.

A cured film having a thickness of 50 μm which is prepared by polymerizing and curing the resin composition for an optical material comprising (A) the carboxylic acid-modified phenoxy resin, (B) the polymerizable compound and (C) the polymerization initiator according to the present invention has preferably a transmittance of 80% or more at a wavelength of 400 nm. If it is 80% or more, a transmission amount of light is satisfactory. From the viewpoint described above, the transmittance is more preferably 85% or more. An upper limit of the transmittance shall not specifically be restricted.

The resin film for an optical material according to the present invention shall be explained below.

The resin film for an optical material according to the present invention comprises the resin composition for an optical material described above, and it can readily be produced by applying the resin varnish for an optical material containing the components (A) to (C) each described above on a suited substrate film and removing the solvent. Also, it may be produced by applying the resin composition for an optical material directly on a substrate film.

The substrate film shall not specifically be restricted and includes, for example, polyesters such as polyethylene terephthalate, polybutylene terephthalate, polyethylene naphthalate and the like; polyolefins such as polyethylene, polypropylene and the like; polycarbonate, polyamide, polyimide, polyamideimide, polyetherimide, polyether sulfide, polyethersulfone, polyether ketone, polyphenylene ether, polyphenylene sulfide, polyallylate, polysulfone, liquid crystal polymers and the like. Among them, preferred from the viewpoints of a flexibility and a toughness are polyethylene terephthalate, polybutylene terephthalate, polyethylene naphthalate, polypropylene, polycarbonate, polyamide, polyimide, polyamideimide, polyphenylene ether, polyphenylene sulfide, polyallylate and polysulfone.

A thickness of the substrate film may suitably be changed according to the targeted flexibility, and it is preferably 3 to 250 μm. If it is 3 μm or more, a strength of the film is sufficiently high, and if it is 250 μm or less, the sufficiently large flexibility is obtained. From the viewpoints described above, the thickness is more preferably 5 to 200 μm, particularly preferably 7 to 150 μm. From the viewpoint of enhancing a peeling property from the resin layer, the film subjected to mold release treatment by a silicone base compound, a fluorine-containing compound and the like may be used if necessary.

The resin film for an optical material produced by applying the resin varnish for an optical material or the resin composition for an optical material on the substrate film may be provided, if necessary, with a protective layer stuck on the resin layer to assume a three layer structure comprising the substrate film, the resin layer and the protective layer.

The protective film shall not specifically be restricted and includes, for example, polyesters such as polyethylene terephthalate, polybutylene terephthalate, polyethylene naphthalate and the like; and polyolefins such as polyethylene, polypropylene and the like. Among them, the polyesters such as polyethylene terephthalate and the polyolefins such as polyethylene and polypropylene are preferred from the viewpoints of a flexibility and a toughness. From the viewpoint of enhancing a peeling property from the resin layer, the film subjected to mold release treatment by a silicone base compound, a fluorine-containing compound and the like may be used if necessary. A thickness of the cover film may be changed according to the targeted flexibility, and it is preferably 10 to 250 μm. If it is 10 μm or more, a strength of the film is sufficiently high, and if it is 250 μm or less, the sufficiently large flexibility is obtained. From the viewpoints described above, the thickness is more preferably 15 to 200 μm, particularly preferably 20 to 150 μm.

A thickness of the resin layer in the resin film for an optical material according to the present invention shall not specifically be restricted and, and it is usually 5 to 500 μm in terms of a thickness after drying. If it is 5 μm or more, the thickness is sufficiently large, and therefore a strength of the resin film or the cured matter obtained from the above film is sufficiently high. On the other hand, if it is 500 μm or less, the resin film can sufficiently be dried. Accordingly, an amount of the solvent remaining in the resin film is not increased, and the cured matter of the above film is not foamed when heated.

The resin composition for an optical material according to the present invention is suited for a resin composition for forming an optical waveguide, and similarly the resin film for an optical material according to the present invention is suited for a resin film for forming an optical waveguide.

The optical waveguide of the present invention shall be explained below.

A cross-sectional drawing of an optical waveguide is shown in (a) of FIG. 1. An optical waveguide 1 is formed on a substrate 5 and constituted from a core part 2 having a high refractive index which comprises a resin composition for forming a core part and a lower cladding layer 4 and an upper cladding layer 3 which have a low refractive index and comprise a resin composition for forming a cladding layer. The resin composition for an optical material and the resin film for an optical material according to the present invention are used preferably for at least one of the lower cladding layer 4, the core part 2 and the upper cladding layer 3 in the optical waveguide 1. They are used more preferably for at least the core part 2 from the viewpoint of possible pattern formation by a developer comprising an alkaline aqueous solution.

Use of the resin film for an optical material makes it possible to enhance more an interlayer close adhesiveness between the clad and the core and a pattern formability (corresponding property between fine lines or narrow lines) in forming a core pattern of the optical waveguide and makes it possible to form fine patterns having a small line width and a small line space. Further, it makes it possible to provide a process having an excellent productivity in which the optical waveguides having a large area can be produced at the same time.

In the optical waveguide 1, a hard substrate such as a silicon substrate, a glass substrate, a glass epoxy resin substrate including an FR-4 substrate and the like can be used for the substrate 5. The optical waveguide 1 may be a flexible optical waveguide prepared by using the substrate film having a flexibility and a toughness described above in place of the substrates described above.

Also, when a substrate film having a flexibility and a toughness is used for the optical waveguide 1, the substrate 5 may be allowed to function as a cover film for the optical waveguide 1. Disposition of a cover film 5 makes it possible to provide the optical waveguide 1 with a flexibility and a toughness of the above cover film 5. Further, it makes the optical waveguide 1 insusceptible to stains and scratches, and therefore the handling property is improved. From the viewpoints described above, the cover film 5 may be disposed at an outside of the upper cladding layer 3 as shown in FIG. 1 (b), and the cover film 5 may be disposed at both outsides of the lower cladding layer 4 and the upper cladding layer 3 as shown in FIG. 1 (c). If the optical waveguide 1 is sufficiently inherent in a flexibility and a toughness, the cover film 5 may not be disposed as shown in FIG. 1 (d).

A thickness of the lower cladding layer 4 shall not specifically be restricted, and it is preferably 2 to 200 μm. If it is 2 μm or more, a transmitted light is readily shut in an inside of the core, and if it is 200 μm or less, a thickness of the whole optical waveguide 1 is prevented from being too large. A thickness of the lower cladding layer 4 is a value measured from a boundary between the core part 2 and the lower cladding layer 4 to an under face of the lower cladding layer 4.

A thickness of the resin film for forming a lower cladding layer shall not specifically be restricted, and the thickness is controlled so that a thickness of the lower cladding layer 4 after cured falls in the range described above.

A height of the core part shall not specifically be restricted, and it is preferably 10 to 100 μm. If a height of the core part is 10 μm or more, a positioning tolerance is prevented from being decreased in coupling with light emitting and light receiving elements or an optical fiber after forming the optical waveguide, and if it is 100 μm or less, a coupling efficiency is prevented from being reduced in coupling therewith after forming the optical waveguide. From the viewpoints described above, a height of the core part is more preferably 15 to 80 μm, particularly preferably 20 to 70 μm. A thickness of the resin film for forming a core part shall not specifically be restricted, and the thickness is controlled so that a height of the core part after cured falls in the range described above.

A thickness of the upper cladding layer 3 shall not specifically be restricted as long as it falls in a range in which the core part 2 can be embedded, and it is preferably 12 to 500 μm in terms of a thickness after curing. A thickness of the upper cladding layer 3 may be the same as or different from a thickness of the lower cladding layer 4 formed at the beginning. From the viewpoint of embedding the core part 2, a thickness of the upper cladding layer 3 is preferably larger than a thickness of the lower cladding layer 4. A thickness of the upper cladding layer 3 is a value measured from a boundary between the core part 2 and the lower cladding layer 4 to an upper face of the upper cladding layer 3.

In the optical waveguide of the present invention, an optical transmission loss is preferably 0.3 dB/cm or less. If it is 0.3 dB/cm or less, a loss of light is reduced, and an intensity of transmission signals is sufficiently large. From the viewpoints described above, the optical transmission loss is more preferably 0.2 dB/cm or less.

Further, in the optical waveguide of the present invention, an optical transmission loss after carrying out three times a reflow test at a maximum temperature of 265° C. is preferably 0.3 dB/cm or less. If it is 0.3 dB/cm or less, a loss of light is reduced, and an intensity of transmission signals is sufficiently large. In addition thereto, parts can be mounted in a reflow process, and therefore use range thereof is broadened. The reflow test at a maximum temperature of 265° C. means a lead-free solder reflow test carried out on conditions according to a JEDE standard (JEDE JESD22A113E).

An application example carried out by using the resin film for an optical material according to the present invention as a resin film for forming an optical waveguide which is the most suitable use shall be described below in details.

The resin film for forming an optical waveguide can be produced as well by the same process as in the resin film for an optical material described above. A substrate used in a step for producing a resin film for forming a core part shall not specifically be restricted as long as it is transmitted by an actinic ray for exposure which is used for forming core patterns described later, and it includes, for example, polyesters such as polyethylene terephthalate, polybutylene terephthalate, polyethylene naphthalate and the like; polyolefins such as polyethylene, polypropylene and the like; polycarbonate, polyphenylene ether, polyallylate and the like. Among them, the polyesters such as polyethylene terephthalate, polybutylene terephthalate, polyethylene naphthalate and the like and the polyolefins such as polypropylene and the like are preferred from the viewpoints of a transmittance of an actinic ray for exposure, a flexibility and a toughness. Further, a substrate film of a high transparent type is more preferably used from the viewpoints of enhancing a transmittance of an actinic ray for exposure and reducing roughening of side walls of the core patterns. The above substrate film of a high transparent type includes Cosmo Shine A1517 and Cosmo Shine A4100 each manufactured by Toyobo Co., Ltd. From the viewpoint of enhancing a peeling property from the resin layer, the film subjected to mold release treatment by a silicone base compound, a fluorine-containing compound and the like may be used if necessary.

A thickness of the substrate film in the resin film for forming a core part falls preferably in a range of 5 to 50 μm. If it is 5 μm or more, a strength thereof as a support is sufficiently high. On the other hand, if it is 50 μm or less, a gap between the photo mask and the resin composition for forming a core part is prevented from being increased in forming the core patterns, and the pattern formability is good. From the viewpoints described above, a thickness of the substrate film falls in a range of more preferably 10 to 40 μm, particularly preferably 15 to 30 μm.

The film for forming an optical waveguide thus obtained which is provided on the substrate can readily be stored by, for example, reeling in a roll form. Alternatively, the roll-shaped film can be stored as well in a sheet form by cutting the film in a suited size.

A production process in which the resin film for forming an optical waveguide is used for the lower cladding layer, the core part and the upper cladding layer to form an optical waveguide shall explained below.

First, a resin film for forming a lower cladding layer is laminated on a substrate 5 to form a lower cladding layer 4. The laminating method includes a method in which the resin film is laminated by pressing while heating. In this connection, from the viewpoint of a tight adhesiveness and a followability, the resin film is preferably laminated under reduced pressure. A heating temperature of the resin film for forming an optical waveguide is preferably 40 to 130° C., and the bonding pressure is preferably 0.1 to 1.0 MPa (1 to 10 kgf/cm$^2$), but these conditions shall not specifically be restricted. When a protective film is present on the resin film for forming a lower cladding layer, it is laminated after removing the protective film.

Then, the resin film for forming a lower cladding layer is cured by light and/or heating. A substrate film for the resin film for forming a lower cladding layer is peeled off, and a resin film for forming a core part is laminated thereon by the same method as described above. In this respect, the resin film for forming a core part is designed so that it has a higher refractive index than that of the resin film for forming a lower cladding layer, and it comprises preferably a light-sensitive resin composition which can form a core pattern by irradiating with an actinic ray.

Next, the core part is exposed to a light and developed to form a core pattern (core part 2) of an optical waveguide. To be specific, an actinic ray is imagewise irradiated through a negative or positive mask pattern which is called an art work. Further, an actinic ray may be irradiated on an image by using laser direct drawing without passing through a photo mask. A light source for the actinic ray includes, for example, publicly known light sources which effectively irradiate a UV ray, such as a carbon arc lamp, a mercury vapor arc lamp, a ultra-high pressure mercury lamp, a high pressure mercury lamp, a Xenon lamp and the like. In addition thereto, it includes as well light sources which effectively irradiate a visible light, such as a flood bulb for photography, a sunlight lamp and the like. After-exposure heating may be carried out after exposure from the viewpoints of enhancing the resolution and the core pattern tight adhesiveness. Time spent from irradiation with a UV ray to after-exposure heating is preferably within 10 minutes. If the time is within 10 minutes, activated species produced by irradiation with a UV ray are prevented from being deactivated. Temperature for after-exposure heating is preferably 40 to 160° C., and the time is preferably 30 seconds to 10 minutes.

After exposure, a substrate film for the resin film for forming a core part is peeled off, and development is carried out by a publicly known method such as, for example, spraying, shaking immersion, brushing, scrubbing and the like using a developer corresponding to the composition of the resin film for forming a core part described above, such as an alkaline aqueous solution, a water base developer and the like. Two or more kinds of the developing methods may be used, if necessary, in combination.

A base for the alkaline aqueous solution described above shall not specifically be restricted and includes, for example, alkali hydroxides such as hydroxides of lithium, sodium and potassium; alkali carbonates such as carbonates or bicarbonates of lithium, sodium, potassium and ammonium; alkali metal phosphates such as potassium phosphate, sodium phosphate and the like; alkali metal pyrophosphates such as sodium pyrophosphate, potassium pyrophosphate and the like; sodium salts such as borax, sodium metasilicate and the like; and organic bases such as tetramethylammonium hydroxide, triethanolamine, ethylenediamine, diethylenetriamine, 2-amino-2-hydroxymethyl-1,3-propanediol, 1,3-diaminopropanol-2-morpholine and the like. A pH of the alkaline aqueous solution used for the development falls in a range of preferably 9 to 11, and the temperature is controlled according to the developability of the layer of the resin composition for forming a core part. Further, the alkaline aqueous solution may be mixed with a surfactant, a defoaming agent and a small amount of an organic solvent for accelerating the development.

The water base developer described above shall not specifically be restricted as long as it comprises water or an alkaline aqueous solution and at least one kind of an organic solvent. A pH of the water base developer is preferably lowered as much as possible as long as the resin film for forming a core part described above can sufficiently be developed, and the pH is preferably 8 to 12, more preferably 9 to 10. The organic solvent described above includes, for example, triacetone alcohol, acetone, ethyl acetate, methanol, ethanol, isopropanol, butanol, methyl cellosolve, ethyl cellosolve, butyl cellosolve, diethylene glycol monomethyl ether, diethylene glycol monoethyl ether, diethylene glycol monobutyl ether and the like. They can be used alone or in combination of two or more kinds thereof. Usually, a concentration of the organic solvent is preferably 2 to 90 mass %, and the temperature is controlled according to the developability of the layer of the resin composition for forming a core part. Further, the water base developer can be mixed with small amounts of a surfactant, a defoaming agent and the like.

The core patterns may be cured more, if necessary, by heating at 60 to 250° C. or carrying out exposure at 0.1 to 1000 mJ/cm² as treatment after development.

Next, a resin film for forming an upper cladding layer is laminated by the same method as described above to form an upper cladding layer 3. In this regard, the resin film for forming an upper cladding layer is designed so that it has a lower refractive index than that of the resin film for forming a core part. Then, curing is carried out by light and/or heat by the same method as described above, and the substrate film is peeled off if necessary, whereby an optical waveguide can be prepared.

The optical waveguide of the present invention is excellent in a heat resistance and a transparency and therefore may be used as an optical transmission line for an optical module. The form of the optical module includes, for example, an optical waveguide provided with optical fibers in which the optical fibers are connected at both ends of the optical waveguide, an optical waveguide provided with connecters in which the connecters are connected at both ends of the optical waveguide, a photoelectric composite substrate in which an optical waveguide is composite with a printed wiring board, a photoelectric conversion module in which an optical waveguide is combined with a light/electricity conversion element for mutually converting a light signal and an electric signal and a wavelength coupling & branching device in which an optical waveguide is combined with a wavelength split filter. In the photoelectric combined substrate, the combined printed wiring board shall not specifically be restricted, and either of a rigid substrate such as a glass epoxy substrate and the like and a flexible substrate such as a polyimide substrate and the like may be used.

EXAMPLES

The examples of the present invention shall more specifically be explained below, but the present invention shall not be restricted to these examples.

Production Example 1

Preparation of Carboxylic Acid-Modified Phenoxy Resin

A bisphenol A type phenoxy resin (PKHB, hydroxyl equivalent: 284.35 g/eq, manufactured by InChem Corporation) 100 parts by mass, tetrahydrophthalic anhydride (acid anhydride equivalent: 152.15 g/eq) 37 parts by mass, 1,4-diazabicyclo[2.2.2]octane 0.3 part by mass and N,N-dimethylacetamide 321 parts by mass were weighed into a flask equipped with a stirrer, a cooling tube, an inert gas-introducing port and a thermometer, and the mixture was continued to be stirred at 100° C. for 6 hours under nitrogen gas atmosphere to obtain a carboxylic acid-modified phenoxy resin solution (solid content: 30% by mass) (P-1).

Measurement of Acid Value:

An acid value of the carboxylic acid-modified phenoxy resin (P-1) obtained above was measured to result in finding that it was 100 mg KOH/g. The acid value was calculated from an amount of a 0.1 mol/L potassium hydroxide aqueous solution required for neutralizing the carboxylic acid-modified phenoxy resin solution (P-1). In this case, a point in which phenolphthalein added as an indicator was changed in a color from colorless to a pink color was set to a neutralization point.

Measurement of Weight Average Molecular Weight:

A weight average molecular weight (reduced to standard polystyrene) of the carboxylic acid-modified phenoxy resin (P-1) obtained was measured by means of GPC (SD-8022/DP-8020/RI8020, manufactured by Tosoh Corp.) to result in finding that it was 54,000. Gelpack GL-A160-S manufactured by Hitachi Chemical Co., Ltd. was used for the column.

Production Example 2

Preparation of Carboxylic Acid-Modified Phenoxy Resin

A bisphenol A type phenoxy resin (PKHB, hydroxyl equivalent: 284.35 g/eq, manufactured by InChem Corporation) 100 parts by mass, succinic anhydride (acid anhydride equivalent: 100.07 g/eq) 22 parts by mass, 1,4-diazabicyclo[2.2.2]octane 0.3 part by mass and N,N-dimethylacetamide 285 parts by mass were used to obtain a carboxylic acid-modified phenoxy resin solution (solid content: 30% by mass) (P-2) by the same method as in Production Example 1.

The acid value and the weight average molecular weight were measured by the same methods as in Production Example 1 to result in finding that they were 100 mg KOH/g and 53,000.

Production Example 3

Preparation of Acrylic Polymer

Propylene glycol monomethyl ether acetate 180 parts by mass was weighed into a flask equipped with a stirrer, a cooling tube, an inert gas-introducing port and a thermometer, and the flask was heated up to 90° C. under nitrogen gas atmosphere. Methacrylic acid 15 parts by mass, dicyclopentanyl methacrylate 35 parts by mass, n-butyl acrylate 30 parts by mass, styrene 25 parts by mass and 2,2'-azobis(isobutyronitrile) 3 parts by mass were dropwise added thereto while maintaining 90° C., and the mixture was continued to be stirred at 80° C. for 6 hours to obtain an acrylic polymer solution (solid content: 35% by mass) (P-3).

The acid value and the weight average molecular weight were measured by the same methods as in Production Example 1 to result in finding that they were 98 mg KOH/g and 30,000.

Production Example 4

Preparation of Resin Vanish for Forming a Cladding Layer

A cyclohexanone solution (solid content: 12% by mass) 333.3 parts by mass (solid matter: 40 parts by mass) of an acrylic rubber (HTR-860P-3, manufactured by Nagase ChemteX Corporation) having a molecular weight of about 850,000 as a binder polymer, a hydrogenated bisphenol A (BPA) type epoxy resin (YX-8000, manufactured by Japan Epoxy Resins Co., Ltd.) 60 parts by mass as the polymerizable compound and a photoacid generator triphenylsulfonium hexafluoroantimonate salt (SP-170, manufactured by Asahi Denka Co., Ltd.) 4 parts by mass as a polymerization initiator were weighed into a wide mouth plastic bottle, and the mixture was stirred for 6 hours on the conditions of a temperature of 25° C. and a rotating speed of 400 rpm by means of a mechanical stirrer, a shaft and a propeller to prepare a resin vanish for forming a cladding layer. Then, the resin varnish was filtrated under pressure through a polyflon filter (PF020, manufactured by Advantec Toyo Kaisha, Ltd.) having a pore diameter of 2 μm on the conditions of a temperature of 25° C. and a pressure of 0.4 MPa, and it was further defoamed under reduced pressure for 15 minutes on the condition of a vacuum degree of 50 mm Hg by means of a vacuum pump and a bell jar.
Preparation of Resin Film for Forming a Cladding Layer:

The resin varnish for forming a cladding layer was applied on a non-treated surface of a PET film (A1517, thickness: 16 μm, manufactured by Toyobo Co., Ltd.) by means of an applicator (Multicoater TM-MC, manufactured by Hirano Tecseed Co., Ltd.) and dried at 100° C. for 20 minutes. Then, a polyethylene film (NF-13, thickness: 25 μm, manufactured by TAMAPOLY CO., LTD.) was stuck thereon as a protective film to obtain a resin film for forming a cladding layer. In the present example, the film thicknesses after cured were controlled so that they were 30 μm for a lower cladding layer and 80 μm for an upper cladding layer.

Example 1

Preparation of Resin Varnish for Forming a Core Part

Weighed into a wide mouth plastic bottle were 200 parts by mass (solid matter: 60 parts by mass) of (A) the carboxylic acid-modified phenoxy resin (P-1) solution (solid content: 30% by mass), 20 parts by mass of p-cumylphenoxyethyl acrylate (A-CMP-1E, manufactured by Shin-Nakamura Chemical Co., Ltd.), 20 parts by mass of ethoxylated bisphenol A diacrylate (A-BPE-6, manufactured by Shin-Nakamura Chemical Co., Ltd.) as (B) the polymerizable compound and 2 parts by mass of bis(2,4,6-trimethylbenzoyl)phenylphosphine oxide (Irgacure 819, manufactured by Ciba Specialty Chemicals K.K.) as (C) the polymerization initiator, and the mixture was stirred for 6 hours on the conditions of a temperature of 25° C. and a rotating speed of 400 rpm by means of a mechanical stirrer, a shaft and a propeller to prepare a resin varnish for forming a core part. Then, the resin varnish was filtrated under pressure through the polyflon filter (PF020, manufactured by Advantec Toyo Kaisha, Ltd.) having a pore diameter of 2 μm on the conditions of a temperature of 25° C. and a pressure of 0.4 MPa, and it was further defoamed under reduced pressure for 15 minutes on the condition of a vacuum degree of 50 mm Hg by means of a vacuum pump and a bell jar. It was weighed and stirred to prepare a resin varnish for forming a core part.
Preparation of Resin Film for Forming a Core Part:

The resin varnish for forming a core part was applied on a non-treated surface of the PET film (A1517, thickness: 16 μm, manufactured by Toyobo Co., Ltd.) by means of the applicator (Multicoater TM-MC, manufactured by Hirano Tecseed Co., Ltd.) and dried at 100° C. for 20 minutes. Then, the polyethylene film (NF-13, thickness: 25 μm, manufactured by TAMAPOLY CO., LTD.) was stuck thereon as a protective film to obtain a resin film for forming a core part. In this case, a thickness of the resin layer could optionally be controlled by controlling a gap of the applicator, and it was controlled in the present example so that the film thickness after cured was 50 μm.
Preparation of Cured Film for Measuring Refractive Index and Transmittance The resin film for forming a core part obtained above from which the protective film (NF-13) was peeled off was laminated on a non-treated surface of a PET film (A4100, thickness: 16 μm, manufactured by Toyobo Co., Ltd.) on the conditions of a pressure of 0.5 MPa, a temperature of 50° C. and a pressure time of 30 seconds by means of a vacuum press laminator (MVLP-500/600, manufactured by Meiki Co., Ltd.). Next, the film was irradiated with a UV ray (wavelength: 365 nm) at an intensity of 1000 mJ/cm$^2$ by means of a UV ray exposing equipment (MAP-1200-L, manufactured by Dainippon Screen Mfg. Co., Ltd.), and then the PET films (A1517 and A4100) were removed. It was dried at 160° C. for one hour to obtain a cured film having a thickness of 50 μm.
Measurement of a Refractive Index:

A refractive index of the cured film obtained above was measured at a temperature of 25° C. and a wavelength of 830 nm by means of a prism coupler (Model 2010, manufactured by Metricon Corporation) to result in finding that it was 1.553.
Measurement of a Transmittance:

A transmittance of the cured film obtained above was measured at a temperature of 25° C. and a wavelength of 400 nm by means of a spectrophotometer (U-3410, manufactured by Hitachi, Ltd.) to result in finding that it was 85%.

Preparation of Optical Waveguide:

The resin film for forming a lower cladding layer from which the protective film (NF-13) was peeled off was laminated on an FR-4 substrate (E-679F, manufactured by Hitachi Chemical Co., Ltd.) on the conditions of a pressure of 0.5 MPa, a temperature of 50° C. and a pressure time of 30 seconds by means of the vacuum press laminator (MVLP-500/600, manufactured by Meiki Co., Ltd.). Next, the film was irradiated with a UV ray (wavelength: 365 nm) at an intensity of 1000 mJ/cm$^2$ by means of the UV ray exposing equipment (MAP-1200-L, manufactured by Dainippon Screen Mfg. Co., Ltd.), and then the PET film (A1517) which was the support film was peeled off to form a lower cladding layer 4. Further, the resin film for forming a core part was laminated on the above lower cladding layer 4 on the conditions of a pressure of 0.5 MPa, a temperature of 50° C. and a pressure time of 30 seconds by means of the vacuum press laminator described above.

Next, the film was irradiated with a UV ray (wavelength: 365 nm) at an intensity of 500 mJ/cm$^2$ via a negative type photo mask having a width of 50 µm by means of the UV ray exposing equipment described above, and then it was heated after exposed at 80° C. for 5 minutes. Thereafter, the PET film (A1517) which was the support film was peeled off, and the core pattern (core part 2) was developed in a developer (2.38% by mass tetramethylammonium hydroxide aqueous solution). Subsequently, it was washed with purified water and heated and dried at 100° C. for one hour. Next, the resin film for forming an upper cladding layer was further laminated thereon by the same method and conditions as in forming the lower cladding layer 4, and it was irradiated with a UV ray (wavelength: 365 nm) at an intensity of 3000 mJ/cm$^2$. Thereafter, the PET film (A1517) which was the support film was peeled off, and it was subjected to heating treatment at 160° C. for one hour, whereby an upper cladding layer 3 was formed to obtain an optical waveguide 1 provided with a substrate 5 shown in (a) of FIG. 1. Then, an optical waveguide 1 having a waveguide length of 10 cm was cut out by means of a dicing saw (DAD-341, manufactured by DISCO Corporation).

Measurement of Optical Transmission Loss:

An optical transmission loss of the optical waveguide obtained above was measured using VCSEL (FLS-300-01VCL, manufactured by EXFO Corporation) having a wavelength of 850 nm as a central wavelength which was used for a light source, a photodiode (Q82214, manufactured by Advantest Corporation), an incident fiber (GI-50/125 multimode fiber, NA=0.20) and an output fiber (SI-114/125, NA=0.22) by a cut-back method (measuring waveguide lengths: 10, 5, 3 and 2 cm) to result in finding that it was 0.15 dB/cm.

Figure 2:
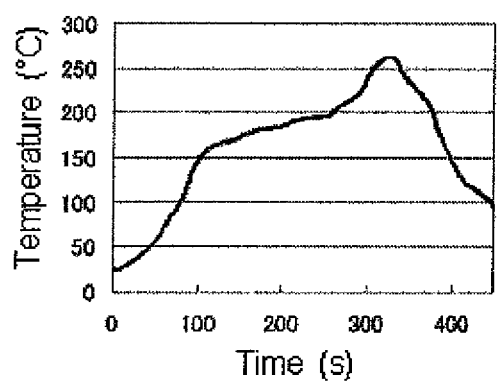
FIG. 2 is a graph showing a temperature profile in a reflow furnace in a reflow test carried out in the present invention.

Reflow Test:

The optical waveguide (waveguide length: 10 cm) obtained above was subjected three times to a reflow test at a maximum temperature of 265° C. on conditions according to JEDE standards (JEDEC JESD22A113E) by means of a reflow tester (Salamander XNA-645PC, manufactured by Furukawa Electric Co., Ltd.). The detailed reflow conditions are shown in Table 1, and the temperature profile in a reflow furnace is shown in FIG. 2.

TABLE 1

| | Zone number | | | | | | |
|---|---|---|---|---|---|---|---|
| | 1 | 2 | 3 | 4 | 5 | 6 | 7 |
| Set temperature (° C.) of upper heater | 175 | 195 | 220 | 250 | 280 | 220 | 0 |
| Set temperature (° C.) of lower heater | 175 | 195 | 220 | 250 | 300 | 240 | — |
| Conveyor speed (cm/minute) | | | | 60 | | | |

An insertion loss value of the flexible optical waveguide after subjected to the reflow test was measured using the same light source, photodiode, incident fiber and output fiber as described above to result in finding that it was 0.26 dB/cm.

Examples 2 to 4 and Comparative Example 1

The materials were blended according to blend ratios shown in Table 2 to obtain cured films for measuring a refractive index and a transmittance and optical waveguides by the same methods as in Example 1. Measured were the refractive indexes and the transmittances of the cured films obtained and the transmission losses of the optical waveguides before and after the reflow test. The results thereof are shown in Table 3.

TABLE 2

| | Items | Blend component | Example | | | | Comparative Example 1 |
|---|---|---|---|---|---|---|---|
| | | | 1 | 2 | 3 | 4 | |
| Core part | Carboxylic aid-modified resin (A) (mass parts) | P-1*[1] | 200 (solid matter 60) | — | 200 (solid matter 60) | — | — |
| | | P-2*[2] | — | 200 (solid matter 60) | — | 200 (solid matter 60) | — |
| | Acrylic polymer | P-3*[3] | — | — | — | — | 200 (solid matter 60) |
| | Polymerizable compound (B) (mass parts) | p-Cumyl-phenoxyethyl acrylate*[4] | 20 | 20 | — | — | 20 |
| | | o-Phenyl-phenoxyethyl acrylate*[5] | — | — | 20 | 20 | — |

TABLE 2-continued

| | Items | Blend component | Example 1 | Example 2 | Example 3 | Example 4 | Comparative Example 1 |
|---|---|---|---|---|---|---|---|
| | | Ethoxylated bisphenol A diacrylate*6 | 20 | 20 | — | — | 20 |
| | | Ethoxylated fluorene diacrylate*7 | — | — | 20 | 20 | — |
| | Polymerization initiator (C) (mass parts) | Bis (2,4,6-trimethyl-benzoyl)-phenyl-phosphine oxide*8 | 2 | 2 | 2 | 2 | 2 |
| Cladding layer | Polymer (mass parts) | HTR-860P-3*9 | 333.3 (solid matter 40) | 333.3 (solid matter 40) | 333.3 (solid matter 40) | 333.3 (solid matter 40) | 333.3 (solid matter 40) |
| | Epoxy resin (mass parts) | Hydrogenated BPA type epoxy resin*10 | 60 | 60 | 60 | 60 | 60 |
| | Polymerization initiator (mass parts) | Triphenyl-sulfonium hexafluoro-antimonate salt*11 | 4 | 4 | 4 | 4 | 4 |

*1 carboxylic acid-modified phenoxy resin solution prepared in Production Example 1
*2 carboxylic acid-modified phenoxy resin solution prepared in Production Example 2
*3 acrylic polymer solution prepared in Production Example 3
*4 p-cumylphenoxyethyl acrylate (A-CMP-1E, manufactured by Shin-Nakamura Chemical Co., Ltd.)
*5 o-phenylphenoxyethyl acrylate (A-LA, manufactured by Shin-Nakamura Chemical Co., Ltd.)
*6 ethoxylated bisphenol A diacrylate (A-BPE-6, manufactured by Shin-Nakamura Chemical Co., Ltd.)
*7 ethoxylated fluorene type diacrylate (A-BPEF-6, manufactured by Shin-Nakamura Chemical Co., Ltd., 9,9-bis[4-(2-acryloyloxyethoxy)phenyl]fluorene)
*8 bis (2,4,6-trimethylbenzoyl)phenylphosphine oxide (Irgacure 819, manufactured by Ciba Specialty Chemicals K.K.)
*9 acrylic rubber (HTR-860P-3, manufactured by Nagase ChemteX Corporation)
*10 hydrogenated BPA type epoxy resin (YX-8000, manufactured by Japan Epoxy Resins Co., Ltd.)
*11 triphenylsulfonium hexafluoroantimonate salt (SP-170, manufactured by Asahi Denka Co., Ltd.)

TABLE 3

| | Items | Example 1 | Example 2 | Example 3 | Example 4 | Comparative Example 1 |
|---|---|---|---|---|---|---|
| Resin film for forming core part | Refractive index*1 | 1.553 | 1.56 | 1.564 | 1.569 | 1.535 |
| | Transmitance (%)*2 | 85 | 84 | 83 | 81 | 87 |
| Optical waveguide | Transmission loss (dB/cm) | 0.15 | 0.17 | 0.17 | 0.19 | 0.15 |
| | Transmission loss (dB/cm) after subjected three times to reflow test | 0.26 | 0.26 | 0.25 | 0.28 | 0.35 |

*1 wavelength 830 nm, 25° C.
*2 wavelength 400 nm, 25° C.

Industrial Applicability

The resin composition for an optical material according to the present invention and the resin film for an optical material comprising the above resin composition are soluble in an alkaline aqueous solution and excellent in a heat resistance and a transparency, and they are used particularly suitably for an optical waveguide. Use of the resin composition for an optical material according to the present invention and the resin film for an optical material comprising the above resin composition makes it possible to produce an optical waveguide which is excellent in a heat resistance and a transparency using an alkaline aqueous solution safer than organic solvents.

The invention claimed is:

1. A resin composition for an optical material comprising (A) a carboxylic acid-modified phenoxy resin containing a repetitive unit A-1 and a repetitive unit A-2, (B) a polymerizable compound and (C) a polymerization initiator:

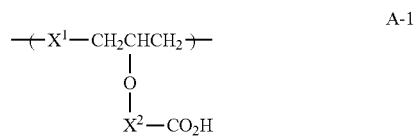

wherein $X^1$ represents any divalent group of:

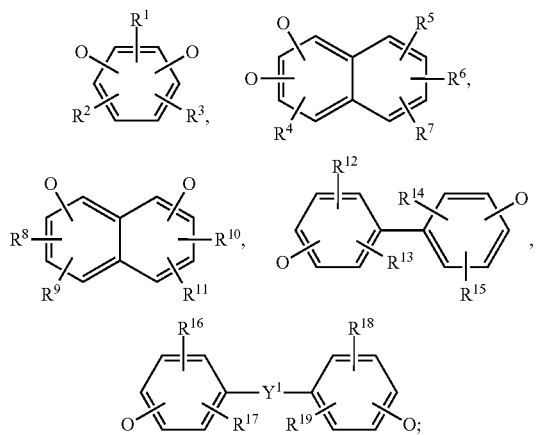

$X^2$ represents a divalent organic group having 1 to 20 carbon atoms; $Y^1$ represents any divalent group of:

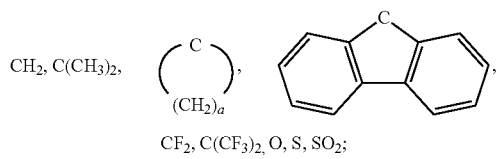

$CF_2$, $C(CF_3)_2$, O, S, $SO_2$;

$R^1$ to $R^{19}$ each represent independently any of a hydrogen atom, a fluorine atom, an organic group having 1 to 20 carbon atoms and a fluorine-containing organic group having 1 to 20 carbon atoms; and a represents an integer of 2 to 10; and

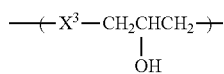

wherein $X^3$ represents any divalent group of:

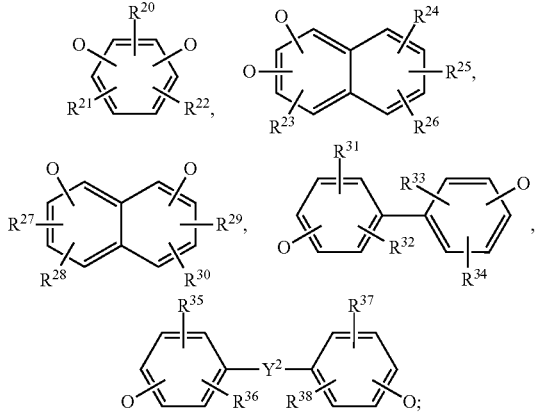

$Y^2$ represents any divalent group of:

$CF_2$, $C(CF_3)_2$, O, S, $SO_2$;

$R^{20}$ to $R^{38}$ each represent independently any of a hydrogen atom, a fluorine atom, an organic group having 1 to 20 carbon atoms and a fluorine-containing organic group having 1 to 20 carbon atoms; and b represents an integer of 2 to 10, wherein the polymerizable compound (B) is a compound containing at least one of an ethylenically unsaturated group and two or more epoxy groups in a molecule thereof.

2. The resin composition for an optical material as described in claim 1, wherein a blend amount of the component (A) is 10 to 85% by mass based on the total amount of the component (A) and the component (B); a blend amount of the component (B) is 15 to 90% by mass based on a total amount of the component (A) and the component (B); and a blend amount of the component (C) is 0.1 to 10 parts by mass based on a total amount 100 parts by mass of the component (A) and the component (B).

3. A resin composition for an optical material comprising (A) a carboxylic acid-modified phenoxy resin containing a repetitive unit A-1 and a repetitive unit A-2, (B) a polymerizable compound and (C) a polymerization initiator:

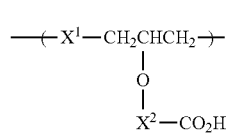

wherein $X^1$ represents any divalent group of:

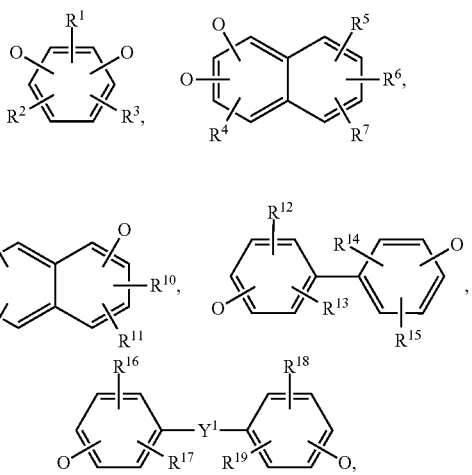

$X^2$ represents a divalent organic group having 1 to 20 carbon atoms; $Y^1$ represents any divalent group of:

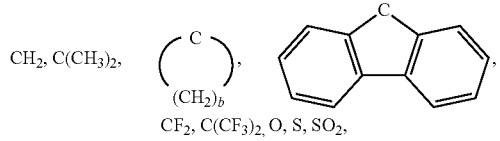

$R^1$ to $R^{19}$ each represent independently any of a hydrogen atom, a fluorine atom, an organic group having 1 to 20 carbon atoms and a fluorine-containing organic group having 1 to 20 carbon atoms; and a represents an integer of 2 to 10; and

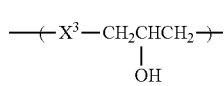
A-2 wherein $X^3$ represents any divalent group of:

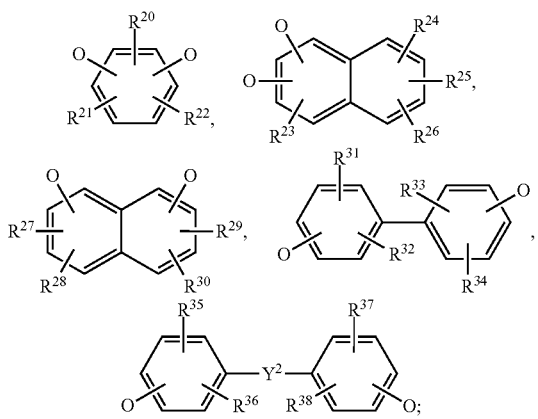

$Y^2$ represents any divalent group of:

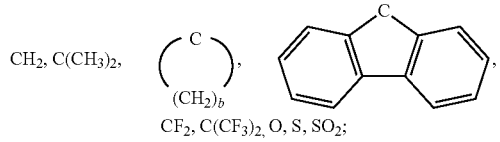

$R^{20}$ to $R^{38}$ each represent independently any of a hydrogen atom, a fluorine atom, an organic group having 1 to 20 carbon atoms and a fluorine-containing organic group having 1 to 20 carbon atoms; and b represents an integer of 2 to 10, wherein the polymerizable compound (B) is at least one of compounds represented by the following Formula (3), Formula (4), Formula (5) and Formula (6):

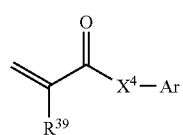
(3)

wherein Ar represents any monovalent group of:

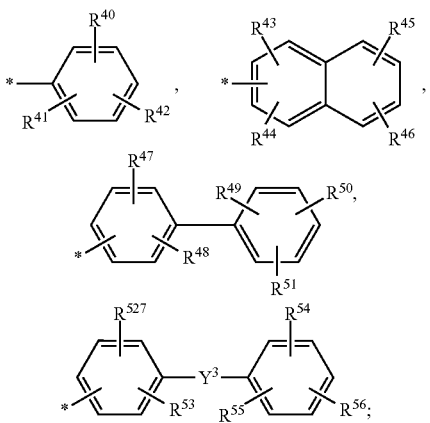

$X^4$ represents an oxygen atom, a sulfur atom or any divalent group of $OCH_2$, $SCH_2$, $O(CH_2CH_2O)_c$, $O[CH_2CH_2(CH_3)O]_d$ and $OCH_2CH(OH)CH_2O$;

$Y^3$ represents any divalent group of:

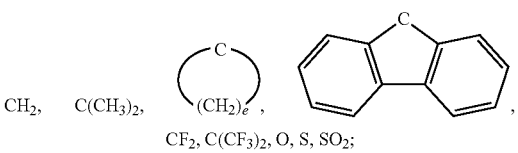

$R^{39}$ represents any of a hydrogen atom and methyl; $R^{40}$ to $R^{56}$ each represent independently any of a hydrogen atom, a fluorine atom, an organic group having 1 to 20 carbon atoms and a fluorine-containing organic group having 1 to 20 carbon atoms; c and d each represent independently an integer of 1 to 20, and e represents an integer of 2 to 10;

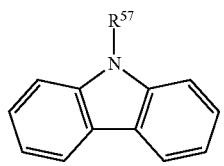
(4)

wherein $R^{57}$ represents:

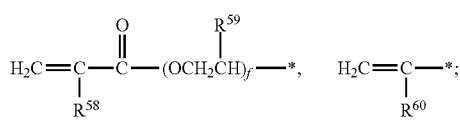

$R^{58}$ to $R^{60}$ each represent independently any of a hydrogen atom and methyl; and f represents an integer of 1 to 10;

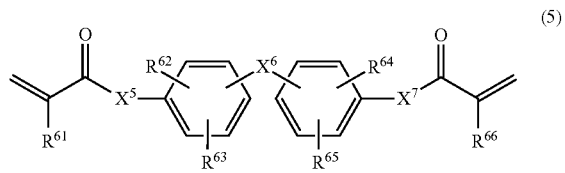
(5)

wherein $X^5$ and $X^7$ each represent independently an oxygen atom, a sulfur atom or any divalent group of $O(CH_2CH_2O)_g$ and $O[CH_2CH_2(CH_3)O]_h$;

$X^6$ represents any divalent group of:

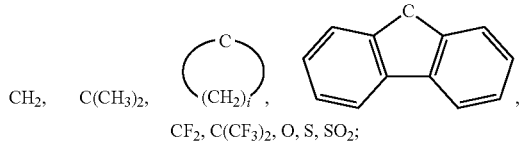

$R^{61}$ and $R^{66}$ each represent independently any of a hydrogen atom and methyl; $R^{62}$ to $R^{65}$ each represent independently any of a hydrogen atom, a fluorine atom, an organic group having 1 to 20 carbon atoms and a fluorine-containing organic group having 1 to 20 carbon atoms; g and h each represent independently an integer of 1 to 20, and i represents an integer of 2 to 10; and

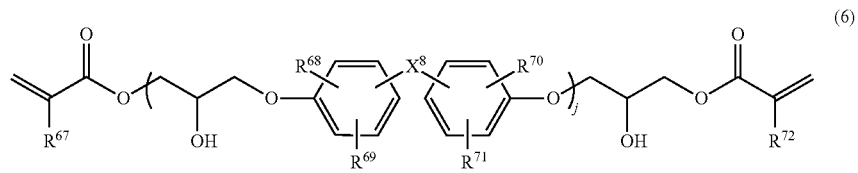

(6)

wherein $X^8$ represents any divalent group of:

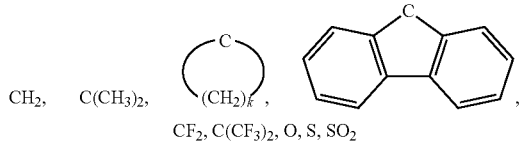

$R^{67}$ and $R^{72}$ each represent independently any of a hydrogen atom and methyl; $R^{68}$ to $R^{71}$ each represent independently any of a hydrogen atom, a fluorine atom, an organic group having 1 to 20 carbon atoms and a fluorine-containing organic group having 1 to 20 carbon atoms; j represents an integer of 1 to 5, and k represents an integer of 2 to 10.

4. The resin composition for an optical material as described in claim 1, wherein the polymerization initiator (C) is a photoradical polymerization initiator.

5. The resin composition for an optical material as described in claim 1, wherein a cured film prepared by polymerizing and curing the resin composition for an optical material has a refractive index of 1.400 to 1.700 at a temperature of 25° C. and a wavelength of 830 nm.

6. The resin composition for an optical material as described in claim 1, wherein a cured film having a thickness of 50 μm prepared by polymerizing and curing the resin composition for an optical material has a transmittance of 80% or more at a temperature of 25° C. and a wavelength of 400 nm.

7. A resin film for an optical material comprising the resin composition for an optical material as described in claim 1.

8. An optical waveguide having a core part and/or a cladding layer formed by curing by light and/or heating a resin composition for an optical material comprising (A) a carboxylic acid-modified phenoxy resin containing a repetitive unit A-1 and a repetitive unit A-2, (B) a polymerizable compound and (C) a polymerization initiator:

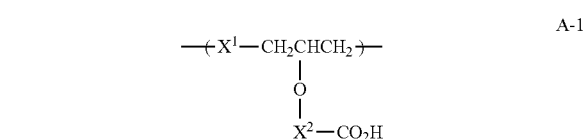

A-1 wherein $X^1$ represents any divalent group of:

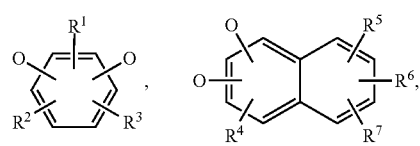

-continued

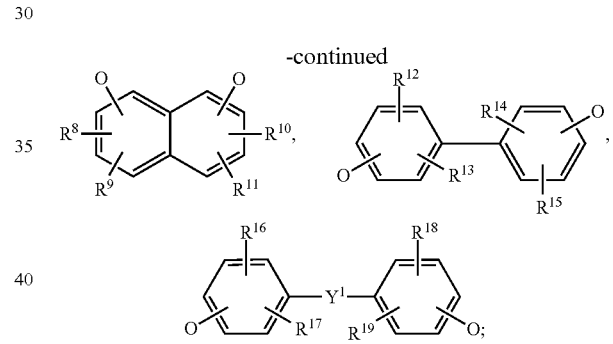

$X^2$ represents a divalent organic group having 1 to 20 carbon atoms; $Y^1$ represents any divalent group of:

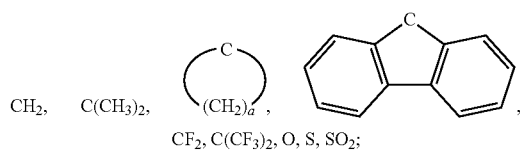

$R^1$ to $R^{19}$ each represent independently any of a hydrogen atom, a fluorine atom, an organic group having 1 to 20 carbon atoms and a fluorine-containing organic group having 1 to 20 carbon atoms; and a represents an integer of 2 to 10; and

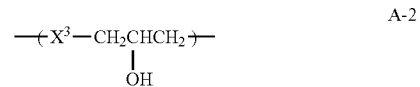

A-2 wherein X³ represents any divalent group of:

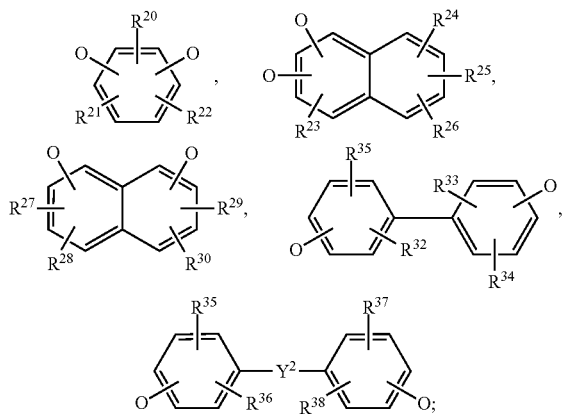

Y² represents any divalent group of:

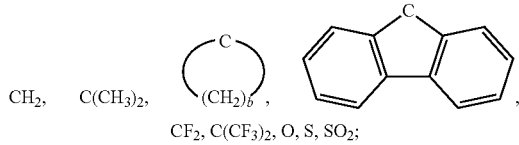

R²⁰ to R³⁸ each represent independently any of a hydrogen atom, a fluorine atom, an organic group having 1 to 20 carbon atoms and a fluorine-containing organic group having 1 to 20 carbon atoms; and b represents an integer of 2 to 10.

9. An optical waveguide having a core part and/or a cladding layer formed by curing by light and/or heating the resin film for an optical material as described in claim 7.

10. An optical waveguide having a core part formed by curing by light and/or heating the resin film for an optical material as described in claim 7.

11. The optical waveguide as described in claim 8, wherein an optical transmission loss is 0.3 dB/cm or less.

12. The optical waveguide as described in claim 8, wherein an optical transmission loss after subjected three times to a reflow test at a maximum temperature of 265° C. is 0.3 dB/cm or less.

13. The resin composition for an optical material as described in claim 3, wherein the polymerization initiator (C) is a photoradical polymerization initiator.

14. The resin composition for an optical material as described in claim 3, wherein a cured film prepared by polymerizing and curing the resin composition for an optical material has a refractive index of 1.400 to 1.700 at a temperature of 25° C. and a wavelength of 830 nm.

15. The resin composition for an optical material as described in claim 3, wherein a cured film having a thickness of 50 μm prepared by polymerizing and curing the resin composition for an optical material has a transmittance of 80% or more at a temperature of 25° C. and a wavelength of 400 nm.

16. A resin film for an optical material comprising the resin composition for an optical material as described in claim 3.

17. An optical waveguide having a core part and/or a cladding layer formed by curing by light and/or heating the resin film for an optical material as described in claim 16.

18. An optical waveguide having a core part formed by curing by light and/or heating the resin film for an optical material as described in claim 16.

19. The resin film for an optical material according to claim 7, formed by applying a resin varnish containing said resin composition on a substrate, and removing a solvent of the resin varnish.

20. The resin film for an optical material according to claim 7, formed by applying the resin composition directly on a substrate.

* * * * *